(12) United States Patent
Jang et al.

(10) Patent No.: US 12,498,823 B2
(45) Date of Patent: Dec. 16, 2025

(54) TOUCH DISPLAY DEVICE, DRIVING CIRCUIT, AND DRIVING METHOD

(71) Applicant: LG Display Co., Ltd., Seoul (KR)

(72) Inventors: Laebong Jang, Incheon (KR); YongSuk Kim, Paju-si (KR); Seong-Ho Lim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 224 days.

(21) Appl. No.: 18/239,406

(22) Filed: Aug. 29, 2023

(65) Prior Publication Data

US 2024/0160317 A1 May 16, 2024

(30) Foreign Application Priority Data

Nov. 16, 2022 (KR) .................... 10-2022-0153299

(51) Int. Cl.
*G06F 3/041* (2006.01)
*G06F 3/044* (2006.01)

(52) U.S. Cl.
CPC ........ *G06F 3/04184* (2019.05); *G06F 3/0412* (2013.01); *G06F 3/04162* (2019.05); *G06F 3/0441* (2019.05); *G06F 3/0442* (2019.05)

(58) Field of Classification Search
CPC .............. G06F 3/04184; G06F 3/0412; G06F 3/04162; G06F 3/0441; G06F 3/0442; G06F 3/04166; G06F 3/0416; G06F 3/046; H03K 7/02
See application file for complete search history.

(56) References Cited

U.S. PATENT DOCUMENTS

| | | | | |
|---|---|---|---|---|
| 10,809,817 | B2 * | 10/2020 | Katsurahira | G06F 3/03545 |
| 11,422,663 | B1 * | 8/2022 | Tan | G06F 3/03545 |
| 11,755,130 | B2 * | 9/2023 | Hisano | G06F 3/03545 |
| | | | | 345/179 |
| 11,836,318 | B1 * | 12/2023 | Siaw | G06F 3/04162 |
| 11,977,702 | B2 * | 5/2024 | Peretz | G06F 3/0441 |
| 12,236,043 | B2 * | 2/2025 | Kang | G06F 3/04162 |
| 2014/0354583 | A1 * | 12/2014 | Tokutake | G06F 3/0488 |
| | | | | 345/174 |
| 2018/0113523 | A1 * | 4/2018 | Hara | G06F 3/0446 |
| 2022/0083193 | A1 * | 3/2022 | Kang | G09G 3/006 |
| 2022/0129129 | A1 * | 4/2022 | Lim | G06F 3/04162 |
| 2022/0308696 | A1 * | 9/2022 | Lee | G06F 3/0441 |
| 2023/0094725 | A1 * | 3/2023 | Jang | G06F 3/04162 |
| | | | | 345/173 |
| 2023/0140181 | A1 * | 5/2023 | Cheng | G06F 3/03545 |
| | | | | 345/174 |
| 2023/0185398 | A1 * | 6/2023 | Kim | G06F 3/0446 |
| | | | | 345/174 |
| 2023/0266842 | A1 * | 8/2023 | Cho | G06F 3/0412 |
| | | | | 345/174 |
| 2023/0280843 | A1 * | 9/2023 | Chang | G06F 3/0441 |
| | | | | 345/179 |
| 2024/0119877 | A1 * | 4/2024 | So | G09G 3/025 |
| 2025/0068271 | A1 * | 2/2025 | Nomura | G06F 3/0442 |

* cited by examiner

*Primary Examiner* — Bryan Earles
(74) *Attorney, Agent, or Firm* — Birch, Stewart, Kolasch & Birch, LLP

(57) ABSTRACT

A touch display device, a driving circuit, and a driving method according to embodiments of the disclosure can output an uplink signal having a first amplitude before receiving a downlink signal and output an uplink signal having a second amplitude higher than the first amplitude after receiving the downlink signal, thereby effectively mitigating the level of electromagnetic interference noise.

18 Claims, 25 Drawing Sheets

MODE 1

MODE 2

MODE 1

MODE 2

TOUCH DISPLAY DEVICE, DRIVING CIRCUIT, AND DRIVING METHOD

CROSS-REFERENCE TO RELATED APPLICATION

This application claims priority to Korean Patent Application No. 10-2022-0153299, filed in the Republic of Korea on Nov. 16, 2022, the entire contents of which are hereby expressly incorporated by reference into the present application.

BACKGROUND

Field

Embodiments of the disclosure relate to a touch display device, a driving circuit, and a driving method.

Discussion of Related Art

As technology develops, various types of display devices for displaying images are being developed. Among others, touch display devices provide an input scheme that allows users easier and more intuitive and convenient entry of information or commands without the need for buttons, a keyboard, a mouse, or other typical input means.

Pen touch technology, as well as finger touch technology, has been developed for touch display devices as demand for accurate pen touch entry increases.

However, it can be hard to provide pen and finger touch functionality while displaying through the touch display device. For example, as pen touch functionality is supported, electromagnetic interference (EMI) can increase in the touch display device. Thus, the touch display device which is an electronic device can exceed the EMI level that it needs to meet and cause functional issues.

SUMMARY OF THE DISCLOSURE

There can be provided a touch display device, a driving circuit, and a driving method capable of mitigating EMI while supporting pen touch functionality according to embodiments of the disclosure.

There can be provided a touch display device, a driving circuit, and a driving method capable of reducing power consumption while supporting pen touch functionality according to embodiments of the disclosure.

A touch display device according to embodiments of the disclosure can comprise a touch sensor including a plurality of touch electrodes and a touch driving circuit configured to output an uplink signal to at least one of the plurality of touch electrodes and configured to receive a downlink signal output from a pen through at least one of the plurality of touch electrodes.

The touch driving circuit can be configured to output the uplink signal having a first amplitude before receiving the downlink signal and output the uplink signal having a second amplitude larger than the first amplitude after receiving the downlink signal.

The uplink signal can be output at a timing different from a timing at which the downlink signal is received and can include a signal including pen driving control information for allowing the touch display device and the pen to interwork with each other.

The uplink signal can be output at a timing different from a timing at which the downlink signal can be received and can include a ping signal for synchronization of the downlink signal.

The touch driving circuit can output a touch driving signal to at least one of the plurality of touch electrodes at a timing different from a timing at which the uplink signal is output.

The first amplitude of the uplink signal can correspond to an amplitude of the touch driving signal, and the second amplitude of the uplink signal can be larger than the amplitude of the touch driving signal.

The touch driving circuit can be configured to output the uplink signal having the first amplitude during a first period, receive the downlink signal during a second period after the first period, and output the uplink signal having the second amplitude during a third period after the second period.

The touch driving circuit can be configured to output the uplink signal having a first frequency or a first bitrate before receiving the downlink signal, and output the uplink signal having a second frequency or a second bitrate after receiving the downlink signal.

The first frequency can be lower than the second frequency, and the first bitrate cancan be lower than the second bitrate.

A driving circuit according to embodiments of the disclosure can comprise an interface receiving control information and an adjusting unit configured to, based on the control information, output a first pulse modulation signal having a first signal characteristic when a driving mode can be a first mode when no pen touch has occurred, and output a second pulse modulation signal having a second signal characteristic different from the first signal characteristic when the driving mode can be a second mode when a pen touch has occurred.

Each of the first signal characteristic and the second signal characteristic can include an amplitude.

Each of the first signal characteristic and the second signal characteristic can include at least one of a frequency and a bitrate.

A method for driving a touch display device according to embodiments of the disclosure can comprise determining whether a touch has occurred, determining a type of the touch when it is determined that the touch has occurred, supplying a signal corresponding to a first mode to a touch sensor when the touch does not occur or when the touch being a finger touch has occurred, and supplying a signal corresponding to a second mode different from the first mode to the touch sensor when the touch being a pen touch has occurred.

An amplitude of the signal corresponding to the first mode can be smaller than an amplitude of the signal corresponding to the second mode. Further, a frequency or a bitrate of the signal corresponding to the first mode may be smaller than a frequency or a bitrate of the signal corresponding to the second mode.

According to embodiments of the disclosure, there can be provided a touch display device, a driving circuit, and a driving method capable of mitigating EMI while supporting pen touch functionality by controlling the amplitude of the uplink signal.

According to embodiments of the disclosure, there can be provided a touch display device, a driving circuit, and a driving method capable of further mitigating EMI while supporting pen touch functionality by controlling the frequency and/or the bitrate of the uplink signal.

According to embodiments of the disclosure, there can be provided a touch display device, a driving circuit, and a driving method capable of reducing power consumption while supporting pen touch functionality by controlling the uplink signal.

BRIEF DESCRIPTION OF THE DRAWINGS

The above and other objects, features, and advantages of the disclosure will be more clearly understood from the following detailed description, taken in conjunction with the accompanying drawings, in which.

DETAILED DESCRIPTION OF THE EMBODIMENTS

Figure 1:
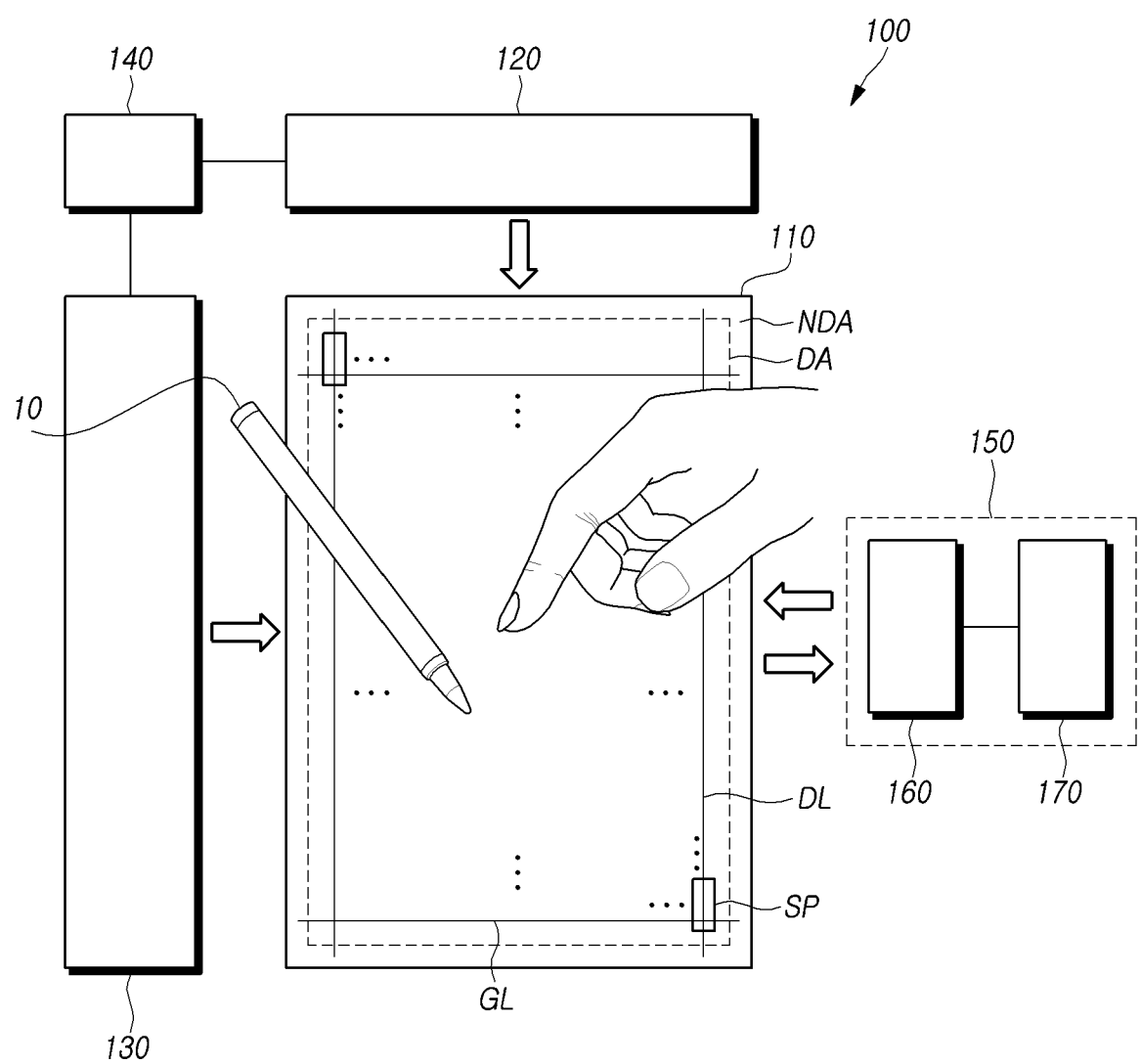
FIG. 1 is a view illustrating a system configuration of a touch display device according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description cancan make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "A", or "B" can be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors e.g., process factors, internal or external impact, noise, etc.) even when a relevant description is not specified. Further, the term "may" fully encompasses all the meanings of the term "can". Further, the term "required" can mean "required" or "needed", and all components of each display device according to all embodiments of the present disclosure are operatively coupled and configured.

Hereinafter, various embodiments of the disclosure are described in detail with reference to the accompanying drawings.

FIG. 1 is a view illustrating a system configuration of a touch display device 100 according to embodiments of the disclosure.

Referring to FIG. 1, the (transparent) touch display device 100 according to embodiments of the disclosure can include a display panel 110 and display driving circuits, as components for displaying images.

The display driving circuits are circuits for driving the display panel 110 and cancan include a data driving circuit 120, a gate driving circuit 130, and a display controller 140.

The display panel 110 can include a display area DA in which images are displayed and a non-display area NDA in which no image is displayed. The non-display area NDA cancan be an outer area of the display area DA and be referred to as a bezel area. The whole or part of the non-display area NDA can be an area visible from the front surface of the touch display device 100 or an area that is bent and not visible from the front surface of the touch display device 100.

The display panel 110 can include a plurality of subpixels SP and various types of signal lines for driving the plurality of subpixels SP.

Various types of signal lines can include a plurality of data lines DL transferring data signals (also referred to as data voltages or image signals) and a plurality of gate lines GL transferring gate signals (also referred to as scanning signals).

The plurality of data lines DL and the plurality of gate lines GL can cross each other. Each of the plurality of data lines DL can be disposed while extending in a first direction. Each of the plurality of gate lines GL can be disposed while extending in a second direction. Here, the first direction can be a column direction and the second direction can be a row direction. The first direction can be the row direction, and the second direction can be the column direction.

The data driving circuit 120 is a circuit for driving the plurality of data lines DL, and cancan output data signals to the plurality of data lines DL. The gate driving circuit 130 is a circuit for driving the plurality of gate lines GL, and can output gate signals to the plurality of gate lines GL.

The display controller 140 is a device for controlling the data driving circuit 120 and the gate driving circuit 130 and can control driving timings for the plurality of data lines DL and driving timings for the plurality of gate lines GL.

The display controller 140 can supply a data driving control signal to the data driving circuit 120 to control the data driving circuit 120 and can supply a gate driving control signal to the gate driving circuit 130 to control the gate driving circuit 130.

The data driving circuit 120 can supply data signals to the plurality of data lines DL according to the driving timing control of the display controller 140. The data driving circuit 120 can receive digital image data from the display controller 140 and can convert the received image data into analog data signals and output them to the plurality of data lines DL.

The gate driving circuit 130 can supply gate signals to the plurality of gate lines GL according to the timing control of the display controller 140. The gate driving circuit 130 can receive a first gate voltage corresponding to a turn-on level voltage and a second gate voltage corresponding to a turn-off level voltage, along with various gate driving control signals (e.g., start signal and reset signal), generate gate signals, and supply the generated gate signals to the plurality of gate lines GL. For example, the first gate voltage can be higher than the second gate voltage. Alternatively, the second gate voltage can be higher than the first gate voltage.

For example, the data driving circuit 120 can be connected with the display panel 110 by a tape automated bonding (TAB) method or connected to a bonding pad of the display panel 110 by a chip on glass (COG) or chip on panel (COP) method or can be implemented by a chip on film (COF) method and connected with the display panel 110.

For example, the gate driving circuit 130 can be connected with the display panel 110 by TAB method or connected to a bonding pad of the display panel 110 by a COG or COP method or can be connected with the display panel 110 according to a COF method. Alternatively, the gate driving circuit 130 can be formed in a gate in panel (GIP) type, in the non-display area NDA of the display panel 110. The gate driving circuit 130 can be disposed on the substrate or can be connected to the substrate. In other words, the gate driving circuit 130 that is of a GIP type can be disposed in the non-display area NDA of the substrate. The gate driving circuit 130 that is of a chip-on-glass (COG) type or chip-on-film (COF) type can be connected to the substrate.

Meanwhile, at least one of the data driving circuit 120 and the gate driving circuit 130 can be disposed in the display area DA of the display panel 110. For example, at least one of the data driving circuit 120 and the gate driving circuit 130 can be disposed not to overlap the subpixels SP or to overlap all or some of the subpixels SP.

The data driving circuit 120 can be connected to one side (e.g., an upper or lower side) of the display panel 110. Depending on the driving scheme or the panel design scheme, data driving circuits 120 can be connected with both the sides (e.g., both the upper and lower sides) of the display panel 110, or two or more of the four sides of the display panel 110.

The gate driving circuit 130 can be connected to one side (e.g., a left or right side) of the display panel 110. Depending on the driving scheme or the panel design scheme, gate driving circuits 130 can be connected with both the sides (e.g., both the left and right sides) of the display panel 110, or two or more of the four sides of the display panel 110.

The display controller 140 can be implemented as a separate component from the data driving circuit 120, or the display controller 140 and the data driving circuit 120 can be integrated into an integrated circuit (IC).

The display controller 140 can be a timing controller used in typical display technology, a control device that can perform other control functions as well as the functions of the timing controller, or a control device other than the timing controller, or can be a circuit in the control device. The display controller 140 can be implemented as various circuits or electronic components, such as an integrated circuit (IC), a field programmable gate array (FPGA), an application specific integrated circuit (ASIC), or a processor.

The display controller 140 can be mounted on a printed circuit board or a flexible printed circuit and can be electrically connected with the data driving circuit 120 and the gate driving circuit 130 through the printed circuit board or the flexible printed circuit.

The display controller 140 can transmit/receive signals to/from the data driving circuit 120 according to one or more predetermined interfaces. The interface can include, e.g., a low voltage differential signaling (LVDS) interface, an embedded clock point-point interface (EPI), and a serial peripheral interface (SPI).

The touch display device 100 can be a liquid crystal display device or a self-emission display device in which the display panel 110 emits light by itself. In other words, the display panel 110 can be a liquid crystal display panel or a self-luminous display panel.

Meanwhile, the touch display device 100 according to embodiments of the disclosure can include a touch panel and a touch sensing circuit 150 to further provide a touch sensing function as well as an image display function.

The touch sensing circuit 150 can detect the presence of a touch (finger touch or pen touch) by a touch object, such as a finger or pen 10, or touch position by sensing the touch panel.

For example, the touch sensing circuit 150 can include a touch driving circuit 160 that drives and senses the touch panel and generates and outputs touch sensing data and a touch controller 170 that can detect an occurrence of a touch or the position of the touch using touch sensing data.

The touch panel can include a plurality of touch electrodes as touch sensors. The touch panel can further include a plurality of touch lines for electrically connecting the plurality of touch electrodes and the touch driving circuit 160.

The touch panel can exist outside or inside the display panel 110. When the touch panel exists outside the display panel 110, the touch panel is referred to as an external type. When the touch panel is of the external type, the touch panel and the display panel 110 can be separately manufactured or can be combined during an assembly process. The external-type touch panel can include a substrate and a plurality of touch electrodes on the substrate. When the touch panel exists inside the display panel 110, the touch panel is referred to as an internal type. When the touch panel is of the internal type, the touch panel can be formed in the display panel 110 during a manufacturing process of the display panel 110.

The touch driving circuit 160 can supply a touch driving signal to at least one of the plurality of touch electrodes and can sense at least one of the plurality of touch electrodes to generate touch sensing data.

The touch sensing circuit 150 can perform touch sensing in a self-capacitance sensing scheme or a mutual-capacitance sensing scheme.

When the touch sensing circuit 150 performs touch sensing in the self-capacitance sensing scheme, the touch sensing circuit 150 can perform touch sensing based on capacitance between each touch electrode and the touch object (e.g., finger or pen 1).

According to the self-capacitance sensing scheme, each of the plurality of touch electrodes can serve both as a driving touch electrode and as a sensing touch electrode. The touch driving circuit 160 can drive all or some of the plurality of touch electrodes and sense all or some of the plurality of touch electrodes.

When the touch sensing circuit 150 performs touch sensing in the mutual-capacitance sensing scheme, the touch sensing circuit 150 can perform touch sensing based on capacitance between the touch electrodes.

According to the mutual-capacitance sensing scheme, the plurality of touch electrodes are divided into driving touch electrodes and sensing touch electrodes. The touch driving circuit 160 can drive the driving touch electrodes and sense the sensing touch electrodes.

The touch driving circuit 160 and the touch controller 170 included in the touch sensing circuit 150 can be implemented as separate devices or as a single device.

The touch driving circuit 160 and the data driving circuit 120 can be implemented as separate devices or as a single device.

The touch display device 100 can further include a power supply circuit for supplying various types of power to the display driver integrated circuit and/or the touch sensing circuit 150.

The touch display device 100 according to embodiments of the disclosure can be a mobile terminal, such as a smart phone or a tablet, or a monitor or television (TV) in various sizes but, without limited thereto, can be a display in various types and various sizes capable of displaying information or images.

Figure 2:
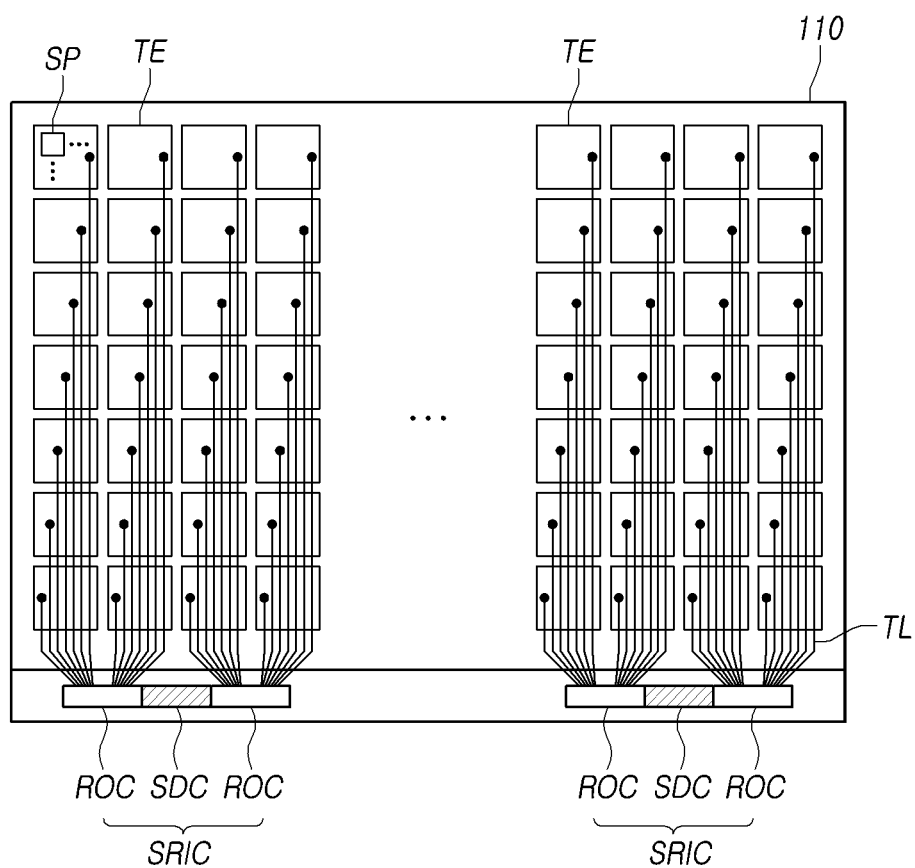
FIG. 2 illustrates a touch sensing system of a touch display device according to embodiments of the disclosure.

FIG. 2 illustrates a touch sensing system of a touch display device 100 according to embodiments of the disclosure.

Referring to FIG. 2, the display panel 110 included in the touch display device 100 can include a touch sensor, and the touch sensor can include a plurality of touch electrodes TE.

For example, the touch driving circuit 160 can include at least one read-out circuit ROC, and the data driving circuit 120 can include at least one source driving circuit SDC.

According to the example of FIG. 2, the touch driving circuit 160 can include a plurality of read-out circuits ROC, and the data driving circuit 120 can include a plurality of source driving circuits SDC. In this case, e.g., one source driving circuit SDC and two read-out circuits ROC can be implemented as one source read-out integrated circuit SRIC. The touch display device 100 can include one or more source read-out integrated circuits SRIC.

Referring to FIG. 2, the display panel 110 can further include a plurality of touch lines TL for electrically connecting the plurality of touch electrodes TE and the touch driving circuit 160.

Referring to FIG. 2, an area in which each of a plurality of touch electrodes TE is disposed can overlap two or more subpixels SP.

Figure 3:
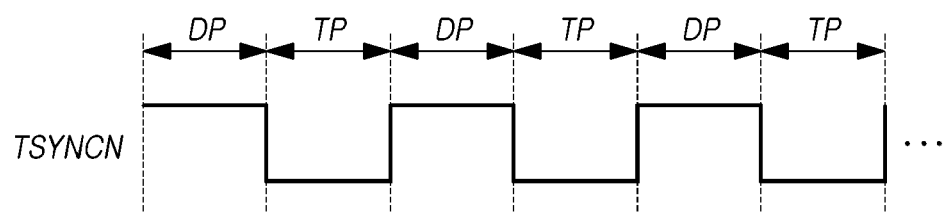
FIG. 3 is an example of a driving timing diagram illustrating a touch display device according to embodiments of the disclosure.

FIG. 3 is an example of a driving timing diagram illustrating a touch display device 100 according to embodiments of the disclosure.

Referring to FIG. 3, the touch display device 100 according to embodiments of the disclosure can perform display driving for image displaying during a display driving period DP, and can perform touch driving for touch sensing during a touch driving period TP.

The touch display device 100 can perform display driving and touch driving in different time periods. In this case, the driving period of the touch display device 100 can be divided into a display driving period DP and a touch driving period TP.

The touch display device 100 can simultaneously perform display driving and touch driving. In this case, the display driving period DP and the touch driving period TP can overlap or be the same period.

Referring to FIG. 3, driving circuits included in the touch display device 100 can recognize a display driving period DP and a touch driving period TP through a touch synchronization signal TSYNCN. For example, the driving circuits that share the touch synchronization signal TSYNCN can include a display controller 140, a touch controller 170, a touch driving circuit 160, a data driving circuit 120, or a gate driving circuit 130.

The touch synchronization signal TSYNCN can include a signal section having a first voltage level and a signal section having a second voltage level different from the first voltage level. In the touch synchronization signal TSYNCN, the signal section having the first voltage level and the signal section having the second voltage level can be alternately repeated.

In the touch synchronization signal TSYNCN, the signal section having the first voltage level can indicate the touch driving period TP, and the signal section having the second voltage level can indicate the display driving period DP.

According to the example of FIG. 3, the first voltage level can be a low-level voltage, and the second voltage level can be a high-level voltage. Alternatively, the first voltage level can be a high-level voltage, and the second voltage level can be a low-level voltage.

Figure 4:
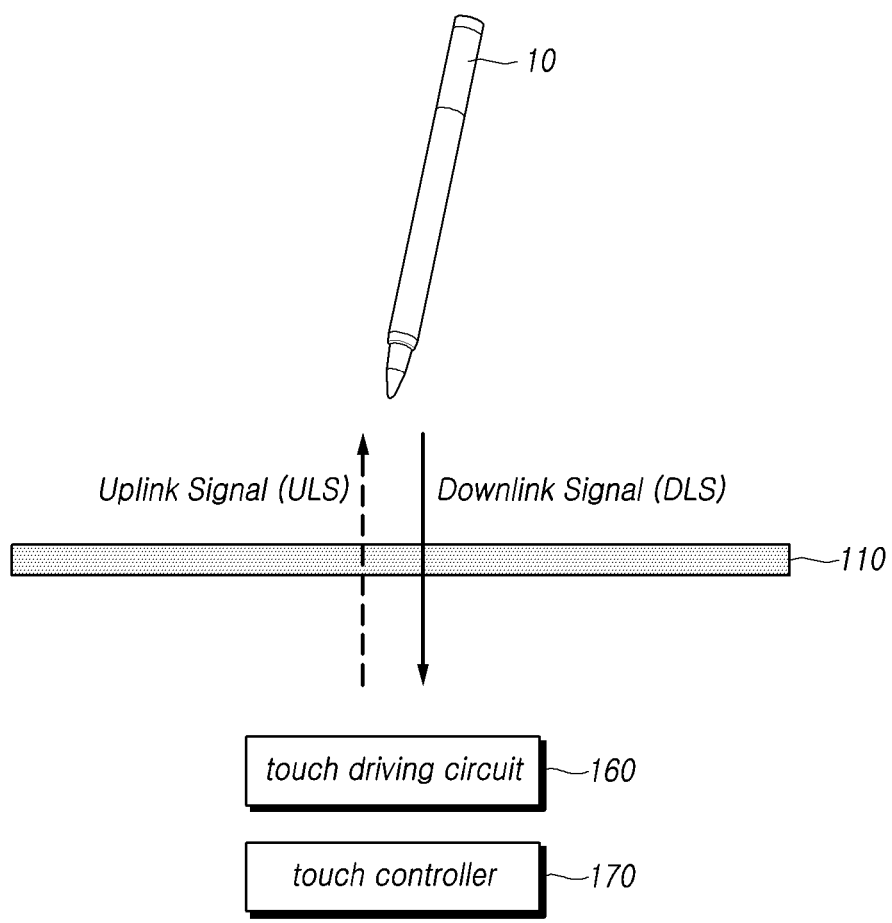
FIG. 4 illustrates uplink communication and downlink communication for pen touch sensing in a touch display device according to embodiments of the disclosure.

FIG. 4 illustrates uplink communication and downlink communication for pen touch sensing in a touch display device 100 according to embodiments of the disclosure.

Referring to FIG. 4, the touch display device 100 according to embodiments of the disclosure can communicate with the pen 10 to sense a touch (a pen touch) by the pen 10.

The communication link between the touch display device 100 and the pen 10 can include an uplink and a downlink. An uplink can be a link (a signal transmission path) from the display panel 110 to the pen 10, and a downlink can be a link (a signal transmission path) from the pen 10 to the display panel 110.

Referring to FIG. 4, for pen touch sensing, signals exchanged between the touch display device 100 and the pen 10 can include an uplink signal ULS and a downlink signal DLS.

The uplink signal ULS can be the signal transmitted from the display panel 110 to the pen 10 through the uplink, and the downlink signal DLS can be the signal transmitted from the pen 10 to the display panel 110 through the downlink.

The downlink signal DLS is a pen signal output from the pen 10. Accordingly, hereinafter, the downlink signal DLS is also referred to as a pen signal.

Referring to FIG. 4, in relation to the transmission method of the uplink signal ULS, the touch driving circuit 160 can apply (output) the uplink signal ULS to at least one of the plurality of touch electrodes TE disposed on the display panel 110, so that the pen 10 adjacent to the touch electrode TE to which the uplink signal ULS is applied can receive the uplink signal ULS.

Referring to FIG. 4, in relation to the transmission method of the downlink signal DLS, when the pen 10 outputs the downlink signal DLS, the downlink signal DLS can be applied to at least one of the plurality of touch electrodes TE disposed on the display panel 110. Accordingly, the touch driving circuit 160 can receive the downlink signal DLS through the touch electrode TE. The touch driving circuit 160 can provide the downlink signal DLS or downlink signal detection result data to the touch controller 170. The touch controller 170 can sense the pen touch based on the downlink signal DLS or the downlink signal detection result data.

In the disclosure, "sensing a pen touch" can mean recognizing identification information (ID) about the pen 10, whether there is the pen 10 (the presence or absence of a pen), whether there is a touch by the pen 10 (the presence or absence of a pen touch), the position of the touch by the pen 10 (the position of the pen touch or the position of the pen), the pressure of the pen 10 pressing the surface of the display panel 110, the slope (tilt) of the pen 10, or various additional information (pen data) about the pen 10.

Figure 5:
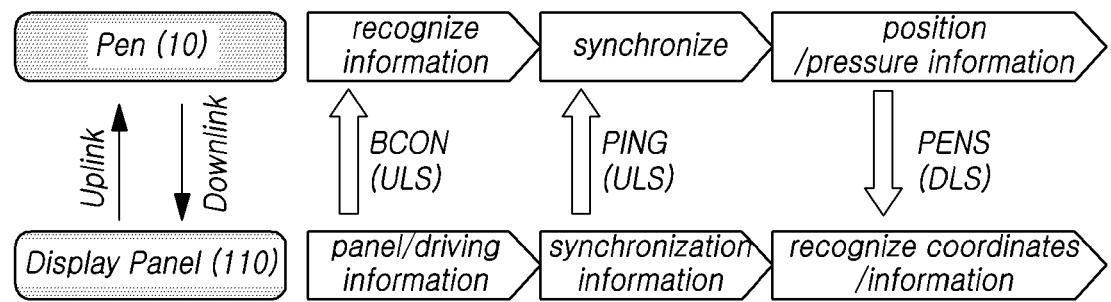
FIG. 5 illustrates a basic pen touch sensing process of a touch display device according to embodiments of the disclosure.
Figure 6:
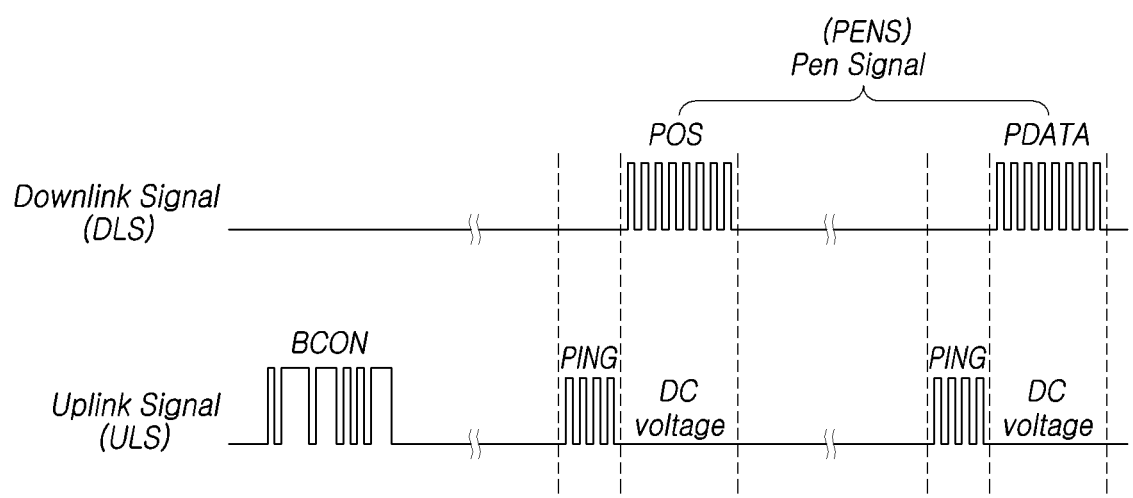
FIG. 6 illustrates an example of an uplink signal and a downlink signal in a touch display device according to embodiments of the disclosure.

FIG. 5 illustrates a basic pen touch sensing process of a touch display device 100 according to embodiments of the disclosure. FIG. 6 illustrates an example of an uplink signal ULS and a downlink signal DLS in a touch display device 100 according to embodiments of the disclosure.

Referring to FIG. 5, a pen touch sensing process performed by the touch display device 100 can be performed through uplink communication and downlink communication.

The pen touch sensing process performed by the touch display device 100 can include transmitting a beacon signal BCON which is an uplink signal ULS (beacon transmission step), transmitting a ping signal PING which is another uplink signal ULS (ping transmission step), and receiving a pen signal PENS which is a downlink signal DLS (pen signal reception step).

Referring to FIGS. 5 and 6, in the beacon transmission step, the touch driving circuit 160 can transmit the beacon signal BCON to the pen 10 by applying the beacon signal BCON, which is a type of the uplink signal ULS, to at least one touch electrode TE disposed on the display panel 110.

The beacon signal BCON can be a signal for the touch display device 100 to control driving of the pen 10 for pen touch sensing or to inform the pen 10 of various control information necessary for pen touch sensing.

The information included in the beacon signal BCON can be important control information necessary for interworking between the touch display device 100 and the pen 10 to sense the pen touch. Hereinafter, for convenience of description, information included in the beacon signal BCON is also referred to as pen touch driving control information.

For example, the pen touch driving control information included in the beacon signal BCON can include one or more of panel information (e.g., panel state information, panel identification information, panel type information, etc.), panel driving mode information (e.g., mode identification information such as pen search mode, pen mode, etc.), characteristic information (e.g., frequency, number of pulses, etc.) about the downlink signal DLS, driving timing-related information for pen touch sensing, and power mode information (e.g., driving timing information at which the display panel 110 and the pen 10 are not driven to reduce power consumption, etc.).

For example, the pen touch driving control information included in the beacon signal BCON can further include synchronization information for driving synchronization between the display panel 110 and the pen 10.

For example, the beacon signal BCON can have a predetermined amplitude and can be transmitted at a predetermined frequency or a predetermined bitrate (unit: bit per second (bps)). Here, the bitrate can refer to a data size in bits to be processed per second.

For example, since the beacon signal BCON is a signal for transmitting control information, the beacon signal BCON can be a pulse modulation signal in which pen touch driving control information is expressed as a plurality of pulses. In this case, from the viewpoint of the signal waveform, the pulse widths of the plurality of pulses included in the beacon signal BCON may not be constant with respect to each other.

In the beacon transmission step, the pen 10 can receive a beacon signal BCON, which is a type of the uplink signal ULS, recognize pen touch driving control information included in the received beacon signal BCON, and perform a driving operation using the recognized pen touch driving control information.

Referring to FIGS. 5 and 6, in the ping transmission step, the touch driving circuit 160 can transmit the ping signal PING to the pen 10 by applying the ping signal PING, which is another type of the uplink signal ULS, to at least one touch electrode TE disposed on the display panel 110.

The ping signal PING, which is another type of the uplink signal ULS, can be a control signal for synchronizing the downlink signal DLS. In other words, the ping signal PING can be a signal for controlling the timing so that the pen 10 can output the pen signal PENS which is the downlink signal DLS according to the operation timing of the touch driving circuit 160.

The pen 10 can receive the ping signal PING and output the pen signal PENS, which is the downlink signal DLS whose output timing is controlled based on the ping signal PING.

For example, the pen 10 can output the pen signal PENS, which is the downlink signal DLS, at a time point at which the last pulse of the ping signal PING is recognized or after a predetermined time elapses therefrom.

The ping signal PING can be composed of one pulse or two or more pulses. When the ping signal PING includes two or more pulses, the ping signal PING can be a pulse modulation signal having a constant pulse width. In other words, the ping signal PING can be a signal in which the high level and the low level regularly swing (or alternate).

For example, the ping signal PING can have a predetermined amplitude and can be transmitted at a predetermined frequency or a predetermined bitrate.

Meanwhile, the synchronization function of the ping signal PING can be provided by the beacon signal BCON. In this case, the ping transmission step can be omitted.

In the pen signal reception step, the touch driving circuit 160 can receive the pen signal PENS output from the pen 10 as the downlink signal DLS through at least one touch electrode TE disposed on the display panel 110.

When the touch driving circuit 160 does not output the uplink signal ULS to the plurality of touch electrodes TE of the display panel 110, the plurality of touch electrodes TE can have a DC voltage.

The pen 10 can output the pen signal PENS, which is the downlink signal DLS, based on the beacon signal BCON received in the beacon transmission step and the ping signal PING received in the ping transmission step.

For example, the pen signal PENS, which is the downlink signal DLS, can include at least one of a pen signal POS that allows the touch display device 100 to recognize the presence or absence of the pen 10 or the position of the pen 10, a pen signal that allows the touch display device 100 to recognize the slope of the pen 10, a pen signal that allows the touch display device 100 to recognize the pressure of the pen 10, and a pen signal PDATA that allows the touch display device 100 to recognize various additional information about the pen 10.

For example, various additional information about the pen 10 can include at least one of the pen manufacturer, pen identification information, pen type information, pen operation information, pen state information, battery, button input information, or the like. Various additional information about the pen 10 or the pen signal PDATA including the same can also be referred to as data or pen data.

For example, the pen signal POS that allows the touch display device 100 to recognize the presence or absence of the pen 10 or the position of the pen 10 and/or the pen signal that allows the touch display device 100 to recognize the slope of the pen 10 can be a signal that does not include information and can be a pulse modulation signal having a predetermined period. Here, the pen signal for recognizing the slope of the pen 10 can be the same as the pen signal POS for recognizing the presence or absence of the pen 10 or the position of the pen 10. For example, the pen signal POS for recognizing the presence or absence of the pen 10 or the position of the pen 10 can be output from a first tip of the pen 10, and the pen signal for recognizing the slope of the pen 10 can be output from both the first tip and a second tip of the pen 10. Here, the first tip can be a tip that directly contacts the display panel 110, and the second tip can be a ring-shaped tip surrounding the first tip.

For example, the pen signal that allows the touch display device 100 to recognize the pressure of the pen 10 and/or the pen signal PDATA that allows the touch display device 100 to recognize various additional information about the pen 10 can be a signal including information and can have a pulse waveform according to the included information without having a predetermined period.

Figure 7:
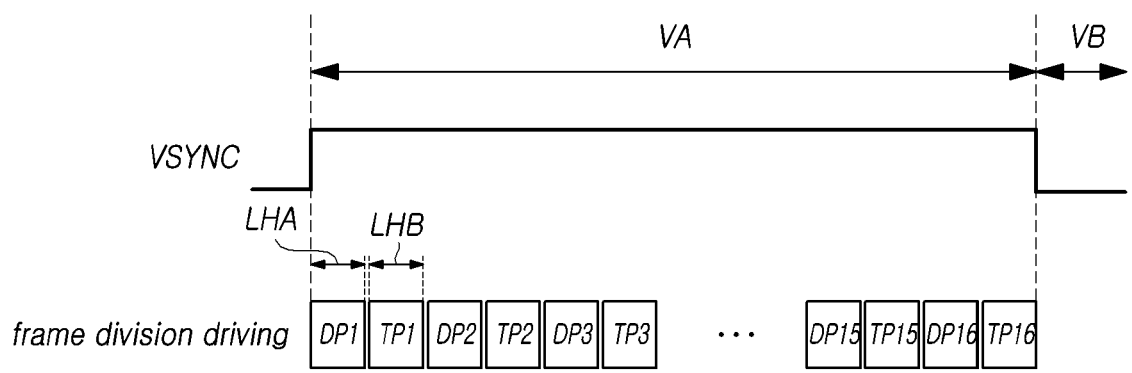
FIG. 7 is an example of a timing diagram illustrating frame division driving of a touch display device according to embodiments of the disclosure.
Figure 8:
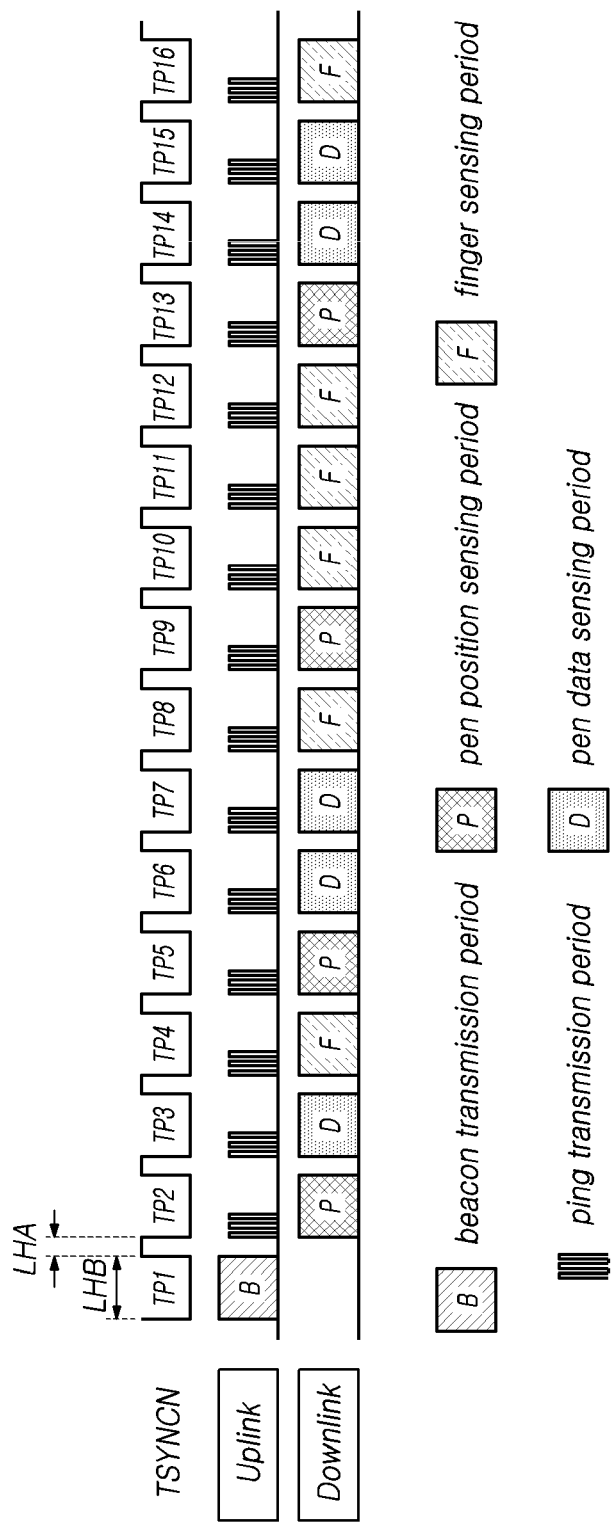
FIG. 8 is an example of a timing diagram exemplarily illustrating pen touch driving during frame division driving of a touch display device according to embodiments of the disclosure.

FIG. 7 is an example of a timing diagram illustrating frame division driving of a touch display device 100 according to embodiments of the disclosure. FIG. 8 is an example of a timing diagram exemplarily illustrating pen touch driving during frame division driving of a touch display device 100 according to embodiments of the disclosure.

Referring to FIG. 7, e.g., the touch display device 100 can define a display frame period using a vertical synchronization signal VSYNC.

Referring to FIG. 7, one display frame period can include a vertical active period VA and a vertical blank period VB. The vertical active period VA can be a period for displaying one image (referred to as a frame as a still image) on the entire display area DA of the display panel 110. The vertical blank period VB can be a period that takes until the next vertical active period VA starts again. In other words, one vertical blank period VB can be present between the two vertical active periods VA.

Referring to FIG. 7, the vertical synchronization signal VSYNC can include a signal section having a first voltage level and a signal section having a second voltage level different from the first voltage level. In the vertical synchronization signal VSYNC, the signal section having the first voltage level and the signal section having the second voltage level can be alternately repeated.

In the vertical synchronization signal VSYNC, the signal section having the first voltage level can indicate a vertical blank period VB, and the signal section having the second voltage level can indicate a vertical active period VA.

According to the example of FIG. 7, in the vertical synchronization signal VSYNC, the first voltage level can be a low-level voltage and the second voltage level can be a high-level voltage. Alternatively, the first voltage level can be a high-level voltage, and the second voltage level can be a low-level voltage.

Referring to FIG. 7, e.g., the touch display device 100 can alternately perform display driving and touch driving during the vertical active period VA. This driving can be referred to as "frame split driving".

According to the frame division driving, one vertical active period VA can include a plurality of horizontal active periods LHA and a plurality of horizontal blank periods LHB. The plurality of horizontal active periods LHA and the plurality of horizontal blank periods LHB can be alternately repeated. The plurality of horizontal active periods LHA can be a plurality of display driving periods, for example, first to sixteen display driving periods DP1 to DP16, and the plurality of horizontal blank periods LHB can be a plurality of touch driving periods, for example, first to sixteen touch driving periods TP1 to TP16.

According to the example of FIG. 7, each of the 16 horizontal active periods LHA can be a period for displaying 1/16 of the full screen. The horizontal blank period LHB can be referred to as a long horizontal blank period, and the horizontal active period LHA can be referred to as a long horizontal active period.

Referring to FIG. 7, according to frame division driving, the touch display device 100 can perform both pen touch sensing and finger touch sensing during a plurality of touch driving periods, for example, first to sixteen touch driving periods TP1 to TP16 corresponding to a plurality of horizontal blank periods LHB included in one vertical active period VA.

Accordingly, it can be necessary to precisely and effectively allocate periods for the plurality of touch driving periods, for example, first to sixteen touch driving periods TP1 to TP16 corresponding to the plurality of horizontal blank periods LHB included in one vertical active period VA. Information related to such period allocation can be provided from the touch display device 100 to the pen 10 through the uplink signal ULS.

Referring to FIGS. 7 and 8, the display frame period can include a vertical active period VA and a vertical blank period VB, and the vertical active period VA can alternately include a plurality of horizontal active periods LHA and a plurality of horizontal blank periods LHB.

Referring to FIGS. 7 and 8, a plurality of horizontal active periods LHA and a plurality of horizontal blank periods LHB can be defined by a touch synchronization signal TSYNCN.

Referring to FIGS. 7 and 8, a plurality of horizontal active periods LHA can be first to sixteen display driving periods DP1 to DP16, and a plurality of horizontal blank periods LHB can be first to sixteen touch driving periods TP1 to TP16.

Referring to FIG. 8, the plurality of horizontal blank periods LHB can include a plurality of touch driving periods TP1, TP2, TP3, TP5, TP6, TP7, TP9, TP13, TP14, and TP15 for sensing a pen touch and a plurality of touch driving periods TP4, TP8, TP10, TP11, TP12, and TP16 for sensing a finger touch.

Referring to FIG. 8, in a plurality of horizontal blank periods LHB, the fourth, eighth, tenth, eleventh, twelfth, and sixteenth touch driving periods TP4, TP8, TP10, TP11, TP12, and TP16 ("F" in FIG. 8) can be finger sensing periods.

During the fourth, eighth, tenth, eleventh, twelfth, and sixteenth touch driving periods TP4, TP8, TP10, TP11, TP12, and TP16, the touch driving circuit 160 can output a touch driving signal for sensing a finger touch to at least one touch electrode TE disposed on the display panel 110. Here, the touch driving signal is not a downlink signal DLS output from the pen 10. Strictly speaking, the touch driving signal is not an uplink signal ULS provided to the pen 10.

Referring to FIG. 8, in a plurality of horizontal blank periods LHB, a plurality of touch driving periods TP1, TP2, TP3, TP5, TP6, TP7, TP9, TP13, TP14, and TP15 for sensing a pen touch can include at least one touch driving period TP1 for transmitting an uplink signal ULS to the pen 10 and two or more touch driving periods TP2, TP3, TP5, TP6, TP7, TP9, TP13, TP14, and TP15 for receiving a downlink signal DLS from the pen 10.

Referring to FIG. 8, the first touch driving period TP1 ("B" in FIG. 8) can be a beacon transmission period for transmitting a beacon signal BCON, which is a type of uplink signal ULS, to the pen 10.

During the first touch driving period TP1, the pen 10 can recognize touch pen driving control information through the beacon signal BCON, and accurately perform a predetermined driving operation at a predetermined timing based on the recognized touch pen driving control information.

Referring to FIG. 8, the second, fifth, ninth, and thirteenth touch driving periods TP2, TP5, TP9, and TP13 ("P" in FIG. 8) can be pen position sensing periods in which the pen signal PENS for sensing the pen position among downlink signals DLS is received from the pen 10.

During the second, fifth, ninth, and thirteenth touch driving periods TP2, TP5, TP9, and TP13, the touch driving circuit 160 can receive the pen signal PENS output from the pen 10 as the downlink signal DLS to recognize the pen position and can further recognize the pen slope.

Referring to FIG. 8, the third, sixth, seventh, fourteenth, and fifteenth touch driving periods TP3, TP6, TP7, TP14, and TP15 ("D" in FIG. 8) can be pen data sensing periods in which the pen signal PENS for sensing data among downlink signals DLS is received from the pen 10.

During the third, sixth, seventh, fourteenth, and fifteenth touch driving periods TP3, TP6, TP7, TP14, and TP15, the touch driving circuit 160 can receive the pen signal PENS output from the pen 10 as the downlink signal DLS to recognize the pen data. Here, the pen data can include various additional information about the pen 10 or pressure information about the pen 10.

Referring to FIG. 8, the plurality of horizontal blank periods LHB can include ping transmission periods. During the ping transmission periods, the touch driving circuit 160 can output the ping signal PING, which is another type of the uplink signal ULS, to the at least one touch electrode TE.

Referring to FIG. 8, the ping transmission periods can be immediately preceding periods of all or some of the remaining touch driving periods TP2, TP3, TP5, TP6, TP7, TP9, TP13, TP14, and TP15 except for the first touch driving period TP1 corresponding to the beacon transmission period B among the plurality of touch driving periods TP1 to TP16 included in the plurality of horizontal blank periods LHB, or can be first half periods of all or some of the remaining touch driving periods TP2, TP3, TP5, TP6, TP7, TP9, TP13, TP14, and TP15.

The period allocation and pen touch driving as illustrated in FIG. 8 can be defined as a pen touch sensing protocol, and the pen touch sensing protocol can be implemented in a program form. A program related to the pen touch sensing protocol can be installed in the touch display device 100 and the pen 10.

Figure 9:
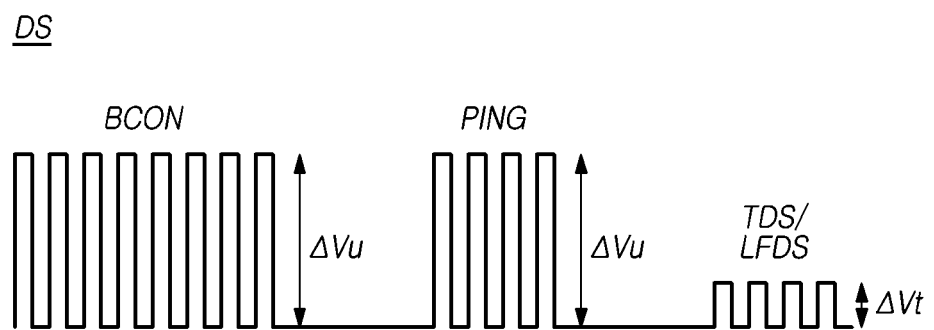
FIG. 9 illustrates an example of three driving signals output from a touch driving circuit of a touch display device according to embodiments of the disclosure.

FIG. 9 illustrates an example of three driving signals DS output from a touch driving circuit 160 of a touch display device 100 according to embodiments of the disclosure.

Referring to FIG. 9, the touch driving circuit 160 can output three driving signals DS. The three driving signals DS can include a beacon signal BCON, a ping signal PING, and a touch driving signal TDS.

The touch driving circuit 160 can output the beacon signal BCON during the touch driving period TP1 allocated as the beacon transmission period B among the plurality of horizontal blank periods LHB.

The touch driving circuit 160 can output a ping signal PING during periods allocated as a ping transmission period (at least one immediately preceding period of at least one of the touch driving periods TP2 to TP16 or a first half period of at least one of the touch driving periods TP2 to TP16) among the plurality of horizontal blank periods LHB.

The touch driving circuit 160 can output the touch driving signal TDS during the touch driving periods TP4, TP8, TP10, TP11, TP12, and TP16 allocated as the finger sensing period F among the plurality of horizontal blank periods LHB.

In each of the touch driving periods TP4, TP8, TP10, TP11, TP12, and TP16 allocated as the finger sensing period F, the touch driving signal TDS can be supplied only to the touch electrode TE to be sensed among the plurality of touch electrodes TE disposed on the display panel 110.

Meanwhile, in each of the touch driving periods TP4, TP8, TP10, TP11, TP12, and TP16 allocated as the finger sensing period F, when the touch driving signal TDS is supplied to the touch electrode TE to be sensed among the plurality of touch electrodes TE disposed on the display panel 110, a load-free driving signal LFDS identical or similar to the touch driving signal TDS can be supplied to the remaining touch electrodes TE not to be sensed.

Further, in each of the touch driving periods TP4, TP8, TP10, TP11, TP12, and TP16 allocated as the finger sensing period F, when the touch driving signal TDS is supplied to the touch electrode TE to be sensed among the plurality of touch electrodes TE disposed on the display panel 110, the load-free driving signal LFDS identical or similar to the touch driving signal TDS can be supplied to the display driving patterns. Here, the display driving patterns can include at least one data line DL, at least one gate line GL, and the like.

As the load-free driving signal LFDS is supplied to the touch electrodes TE that are not to be sensed, unnecessary parasitic capacitance can be prevented from being formed between the touch electrode TE that is to be sensed and the touch electrodes TE that are not to be sensed. Therefore, touch sensitivity can be enhanced.

By supplying the load-free driving signal LFDS to the display driving patterns, it is possible to prevent unnecessary parasitic capacitance from being formed between the touch electrode TE to be sensed and the display driving patterns. Therefore, touch sensitivity can be enhanced.

The load-free driving signal LFDS can have signal characteristics identical or similar to those of the touch driving signal TDS. Here, the signal characteristics can include at least one of frequency, amplitude, phase, and the like. For example, the load-free driving signal LFDS can have the same signal waveform as the touch driving signal TDS. However, the high-level voltage of the load-free driving signal LFDS and the high-level voltage of the touch driving signal TDS can be different from each other, and the low-level voltage of the load-free driving signal LFDS and the low-level voltage of the touch driving signal TDS can be different from each other.

Meanwhile, referring to FIG. 9, the touch driving signal TDS is a modulation signal in which the voltage level changes between the high-level voltage and the low-level voltage, and can have a predetermined amplitude $\Delta Vt$.

Referring to FIG. 9, the low-level voltage of the beacon signal BCON and the low-level voltage of the ping signal PING can be the same or different.

Referring to FIG. 9, the low-level voltage of the uplink signal ULS and the low-level voltage of the touch driving signal TDS can be the same or different.

Referring to FIG. 9, the uplink signal ULS including the beacon signal BCON and the ping signal PING are very important signals for pen touch sensing, and thus can have a large amplitude $\Delta Vu$.

Referring to FIG. 9, the amplitude $\Delta Vu$ of the uplink signal ULS including the beacon signal BCON and the ping signal PING can be larger than the amplitude $\Delta Vt$ of the touch driving signal TDS.

As described above, as the amplitude $\Delta Vu$ of the uplink signal ULS including the beacon signal BCON and the ping signal PING is set to be large, very important information for pen touch sensing can be accurately transferred to the pen 10.

However, when the touch display device 100 supports pen touch sensing, even if there is no pen 10 around the touch display device 100, in other words, even if there is no pen touch or pen operation, the touch display device 100 should operate according to the driving timing as illustrated in FIG. 8 according to the pen touch sensing protocol.

For example, when the touch display device 100 supports pen touch sensing, even if there is no pen 10 around the touch display device 100, in other words, even if there is no pen touch or pen operation, the touch driving circuit 160 of the touch display device 100 should output the uplink signal ULS including the beacon signal BCON and/or the ping signal PING every predetermined timing.

Since the uplink signal ULS including the beacon signal BCON and/or the ping signal PING has a large amplitude $\Delta Vu$, the uplink signal ULS having the large amplitude $\Delta Vu$ can increase electromagnetic interference (EMI) in the touch display device 100. Here, electromagnetic interference is also referred to as electromagnetic interference noise or electromagnetic noise.

The uplink signal ULS should have a large amplitude $\Delta Vu$ to obtain a high signal-to-noise ratio SNR in terms of important control information for pen touch sensing, but can cause an issue of increasing electromagnetic interference EMI. As described above, when the electromagnetic interference EMI is increased by the uplink signal ULS, the electromagnetic interference EMI generated by the touch display device 100, which is an electronic device, can deviate from the electromagnetic interference level required by various regulations.

Accordingly, embodiments of the disclosure can provide a technique for controlling the uplink signal ULS. The control technique of the uplink signal ULS according to embodiments of the disclosure can be a technique for distinguishing between when a high signal-to-noise ratio is required for the uplink signal ULS and when a high signal-to-noise ratio is not required for the uplink signal ULS, and controlling signal characteristics of the uplink signal ULS according to the result. Here, for example, the signal characteristics can include an amplitude, and can further include at least one of a frequency and a bitrate.

Hereinafter, embodiments of the disclosure describe a control technique of an uplink signal ULS.

Figure 10:
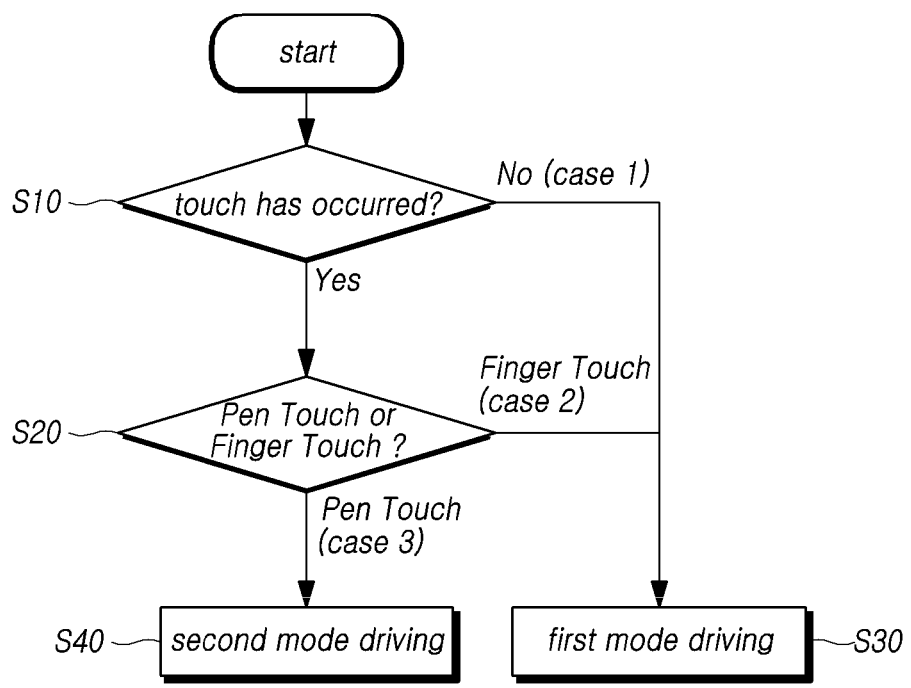
FIG. 10 is a flowchart illustrating a method for controlling an uplink signal in a touch display device according to embodiments of the disclosure.

FIG. 10 is a flowchart illustrating a method for controlling an uplink signal in a touch display device 100 according to embodiments of the disclosure.

In the control technique of the uplink signal ULS according to embodiments of the disclosure, the touch display device 100 can identify whether the pen 10 is present within a predetermined range or a pen touch is generated in order to distinguish when a high signal-to-noise ratio is required for the uplink signal ULS and when a high signal-to-noise ratio is not required for the uplink signal ULS.

In the control technique of the uplink signal ULS according to embodiments of the disclosure, when the pen 10 is present within a predetermined range or a pen touch has occurred, that can be regarded as when a high signal-to-noise ratio is required. Further, when the pen 10 is not present within the predetermined range and no pen touch has occurred, it can be regarded as when the high signal-to-noise ratio is not required.

For example, referring to FIG. 10, a method for controlling an uplink signal ULS of a touch display device 100 according to embodiments of the disclosure can include the step S10 of determining whether a touch has occurred, the step S20 of, when it is determined that a touch has occurred, determining the type of the touch, the step S30 of performing a first mode driving when no touch has occurred (Case 1) or when a touch being a finger touch has occurred (Case 2), and the step S40 of performing a second mode driving when a touch being a pen touch has occurred (Case 3).

According to the control of the uplink signal ULS, during the first mode driving, the uplink signal ULS transmitted from the touch display device 100 to the pen 10 can have a first amplitude, and during the second mode driving, the uplink signal ULS transmitted from the touch display device 100 to the pen 10 can have a second amplitude larger than the first amplitude. For example, the first amplitude can be 3V to 4V, and the second amplitude can be 7V to 9V.

According to additional control of the uplink signal ULS, the uplink signal ULS transmitted from the touch display device 100 to the pen 10 can have a first frequency or a first bitrate during first mode driving, and the uplink signal ULS transmitted from the touch display device 100 to the pen 10 can have a second frequency or a second bitrate during second mode driving. Here, the first frequency can be lower than the second frequency, and the first bitrate can be lower than the second bitrate.

According to the method for controlling the uplink signal ULS according to embodiments of the disclosure, electromagnetic interference can be reduced during first mode driving, and the signal-to-noise ratio can be increased during second mode driving. Accordingly, it is possible to meet the level of electromagnetic interference required for the touch display device 100 without deteriorating the touch sensitivity of the touch display device 100.

The touch controller 170 of the touch display device 100 can determine whether a touch has occurred (whether a finger touch has occurred or a pen touch has occurred) according to whether a downlink signal DLS is received or a load change (which can be a change in RC delay value or a change in capacitance) in the touch electrode TE.

In other words, the touch controller 170 of the touch display device 100 can identify whether a touch by a finger is detected during the touch driving periods (TP4, TP8, TP10, TP11, TP12, and TP16 of FIG. 8) allocated as the finger sensing period or identify whether the downlink signal DLS is actually received during the touch driving periods (TP2, TP3, TP5, TP6, TP7, TP9, TP13, TP14, and TP15 in FIG. 8) allocated as the reception period of the downlink signal DLS, thereby determining whether a touch has occurred.

The touch controller 170 of the touch display device 100 can determine whether a pen is present or whether a pen touch has occurred according to whether the downlink signal DLS is received.

In other words, during the touch driving periods (TP2, TP3, TP5, TP6, TP7, TP9, TP13, TP14, and TP15 of FIG. 8) allocated as the reception period of the downlink signal DLS, the touch controller 170 of the touch display device 100 can determine the type of touch as a pen touch by identifying whether the downlink signal DLS is actually received.

Even if the downlink signal DLS is received, the touch controller 170 of the touch display device 100 can consider that the pen 10 is not present or a pen touch does not occur if the downlink signal DLS is not received again for a predetermined period of time from the time when the downlink signal DLS is received.

When there is no downlink signal DLS, the touch controller 170 of the touch display device 100 can distinguish between a no-touch situation and a finger touch occurrence by using a variation in capacitance or an RC delay value in the touch electrodes TE to which the touch driving signal TDS is applied.

The control technique of the uplink signal ULS according to embodiments of the disclosure can include an amplitude control technique for controlling the amplitude of the uplink signal ULS. The control technique of the uplink signal ULS according to embodiments of the disclosure can further include the frequency control technique (including the bitrate control technique) for controlling the frequency (which can include the bitrate) of the uplink signal ULS.

In other words, as the amplitude control of the uplink signal ULS is performed by the touch driving circuit 160, the uplink signal ULS output from the touch driving circuit 160 before the touch driving circuit 160 receives the downlink signal DLS and the uplink signal ULS output from the touch driving circuit 160 after the touch driving circuit 160 receives the downlink signal DLS can have different signal characteristics.

Here, the signal characteristics are signal characteristics related to an increase or decrease in electromagnetic interference and can include, e.g., amplitude and can further include at least one of frequency and bitrate.

An amplitude control technique of the uplink signal ULS and a frequency control technique of the uplink signal ULS are described below.

Figure 11:
FIG. 11 illustrates an example of amplitude control of an uplink signal in a touch display device according to embodiments of the disclosure.
Figure 11:
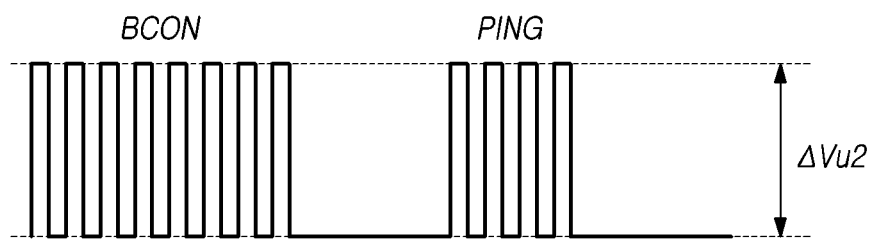

FIG. 11 illustrates an example of amplitude control of an uplink signal ULS in a touch display device 100 according to embodiments of the disclosure.

The touch driving circuit 160 can be configured to output an uplink signal ULS to at least one of a plurality of touch electrodes TE, and can be configured to receive a downlink signal DLS output from the pen 10 through at least one of a plurality of touch electrodes TE.

Referring to FIG. 11, as the amplitude control of the uplink signal ULS is performed by the touch driving circuit 160, the uplink signal ULS output from the touch driving circuit 160 before the touch driving circuit 160 receives the downlink signal DLS and the uplink signal ULS output from the touch driving circuit 160 after the touch driving circuit 160 receives the downlink signal DLS can have different signal characteristics.

When amplitude control of the uplink signal ULS is performed by the touch driving circuit 160, the above-described signal characteristics can be amplitude.

The above-described uplink signal ULS and downlink signal DLS are again described briefly below. When the pen 10 contacts or approaches at least one touch electrode TE to which the uplink signal ULS is applied, the uplink signal ULS can be transferred to the pen 10 through at least one touch electrode TE. When the downlink signal DLS is output from the pen 10, the downlink signal DLS can be applied to at least one touch electrode TE in contact with or adjacent to the pen 10.

The above-mentioned uplink signal ULS can be output at a different timing from the timing of receiving the downlink signal DLS, and can include a beacon signal BCON including pen touch driving control information for interworking between the touch display device 100 and the pen 10.

Further, the uplink signal ULS can be output at a different timing from the timing of receiving the downlink signal DLS, and can further include a ping signal PING, which is a synchronization signal for synchronization of the downlink signal DLS.

Referring to FIG. 11, the driving mode before the touch driving circuit 160 receives the downlink signal DLS can be the first mode MODE 1, and the driving mode after the touch driving circuit 160 receives the downlink signal DLS can be the second mode MODE 2.

Referring to FIG. 11, the amplitude ΔVu1 of the uplink signal ULS output before receiving the downlink signal DLS can be smaller than the amplitude ΔVu2 of the uplink signal ULS output after receiving the downlink signal DLS (ΔVu1<ΔVu2).

In other words, the amplitude ΔVu1 of the uplink signal ULS in the first mode MODE 1 can be smaller than the amplitude ΔVu2 of the uplink signal ULS in the second mode MODE 2 (ΔVu1<ΔVu2).

The first mode MODE 1 can be a driving mode for reducing electromagnetic interference.

The second mode MODE 2 can be a driving mode for increasing a signal-to-noise ratio for the uplink signal ULS.

The first mode MODE 1 can be a driving mode performed when the pen 10 is not present within a predetermined range from the touch display device 100 or when a pen touch by the pen 10 does not occur. The second mode MODE 2 can be a driving mode performed when the pen 10 is present within a predetermined range from the touch display device 100 or a pen touch by the pen 10 has occurred.

The first mode MODE 1 can be a driving mode in a situation in which a signal-to-noise ratio for the uplink signal ULS does not need to be high. The second mode MODE 2 can be a driving mode in a situation in which a signal-to-noise ratio for the uplink signal ULS should be high.

Figure 12:
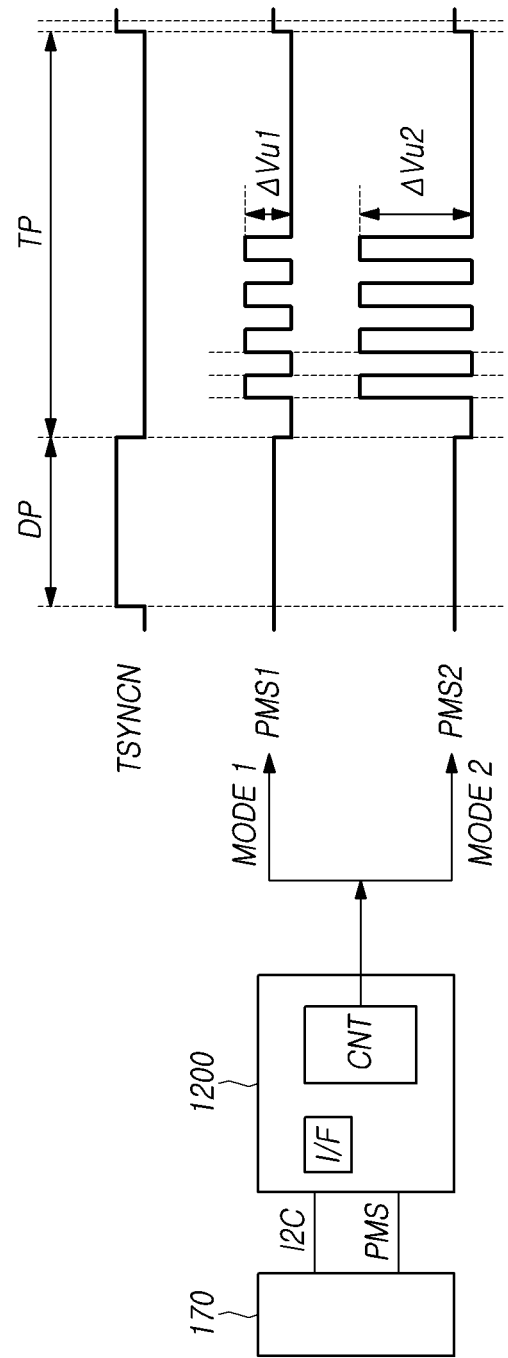
FIGS. 12 and 13 illustrate a circuit configuration for amplitude control of an uplink signal in a touch display device according to embodiments of the disclosure.
Figure 13:
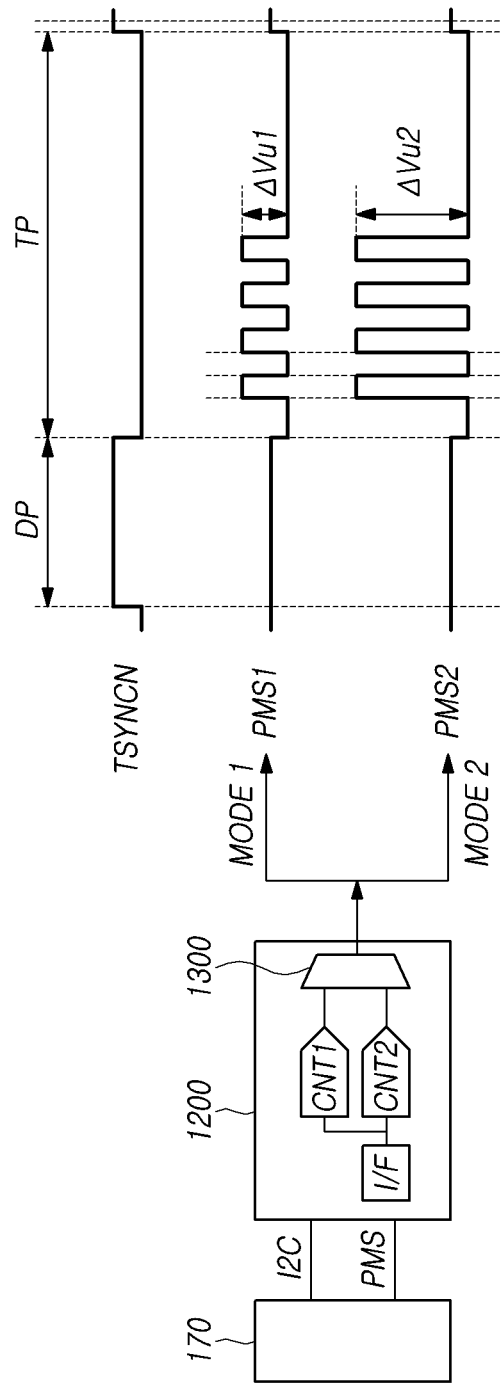

FIGS. 12 and 13 illustrate a circuit configuration for amplitude control of an uplink signal ULS in a touch display device 100 according to embodiments of the disclosure.

Referring to FIGS. 12 and 13, the touch display device 100 can further include a touch power circuit 1200 to control the amplitude of the uplink signal ULS.

The touch power circuit 1200 can be configured to supply a first pulse modulation signal PMS1 having a first amplitude ΔVu1 or a second pulse modulation signal PMS2 having a second amplitude ΔVu2 to the touch driving circuit 160.

The touch driving circuit 160 can receive the first pulse modulation signal PMS1 having the first amplitude ΔVu1 or the second pulse modulation signal PMS2 having the second amplitude ΔVu2, and generate and output an uplink signal ULS having the first amplitude ΔVu1 or an uplink signal ULS having the second amplitude ΔVu2.

The touch driving circuit 160 can be configured to output the uplink signal ULS having the first amplitude ΔVu1 based on the first pulse modulation signal PMS1 before receiving the downlink signal DLS, i.e., in the first mode MODE 1.

The touch driving circuit 160 can be configured to output the uplink signal ULS having the second amplitude ΔVu2 based on the second pulse modulation signal PMS2 after receiving the downlink signal DLS, i.e., in the second mode MODE 2.

Referring to FIGS. 12 and 13, the touch power circuit 1200 and the touch controller 170 can communicate through an interface I/F. For example, the interface I/F between the touch power circuit 1200 and the touch controller 170 can be an inter-integrated circuit (I2C) interface, which is a communication interface for communication between a microprocess and a peripheral device. Here, the touch controller 170 can be a micro controller unit (MCU).

Referring to FIGS. 12 and 13, the touch controller 170 can supply control information for controlling the amplitude of the uplink signal ULS to the touch power circuit 1200 through the I2C interface I/F. Further, the touch controller 170 can supply the reference pulse modulation signal PMS to the touch power circuit 1200.

Referring to FIGS. 12 and 13, the touch power circuit 1200 can output a DC voltage having the constant voltage level during the display driving period DP, and output a first pulse modulation signal PMS1 having the first amplitude ΔVu1 or a second pulse modulation signal PMS2 having the second amplitude ΔVu2 during the touch driving period TP.

Referring to FIG. 12, the touch power circuit 1200 can include an adjusting unit CNT that generates the first pulse modulation signal PMS1 having the first amplitude ΔVu1 or the second pulse modulation signal PMS2 having the second amplitude ΔVu2 based on control information and a reference pulse modulation signal PMS. For example, the adjusting unit CNT can include a digital analog converter.

Referring to FIG. 13, the touch power circuit 1200 can include a first adjusting unit CNT1 configured to generate and output the first pulse modulation signal PMS1 based on the control information and the reference pulse modulation signal PMS, a second adjusting unit CNT2 configured to generate and output the second pulse modulation signal PMS2 based on the control information and the reference pulse modulation signal PMS, and a selecting unit 1300 configured to select one of the first adjusting unit CNT1 and the second adjusting unit CNT2.

Referring to FIG. 13, the first adjusting unit CNT1 can include a first digital analog converter, and the second adjusting unit CNT2 can include a second digital analog converter.

The touch display device 100 according to embodiments of the disclosure can include a first circuit configured to output a first pulse modulation signal PMS1 having a first signal characteristic when the driving mode is a first mode MODE 1 and a second pulse modulation signal PMS2 having a second signal characteristic different from the first signal characteristic when the driving mode is a second mode MODE 2. Here, the first circuit can include the touch power circuit 1200.

The touch display device 100 according to embodiments of the disclosure can include a second circuit configured to output an uplink signal ULS having a first signal characteristic based on the first pulse modulation signal PMS1 or an uplink signal ULS having a second signal characteristic based on the second pulse modulation signal PMS2. Here, the second circuit can include the touch driving circuit 160. For example, each of the first signal characteristic and the second signal characteristic can include an amplitude. When frequency control to be described below is further performed, each of the first signal characteristic and the second signal characteristic can further include a frequency (and/or bitrate).

Figure 14:
FIG. 14 illustrates an example of three driving signals according to amplitude control of an uplink signal in a touch display device according to embodiments of the disclosure.
Figure 14:
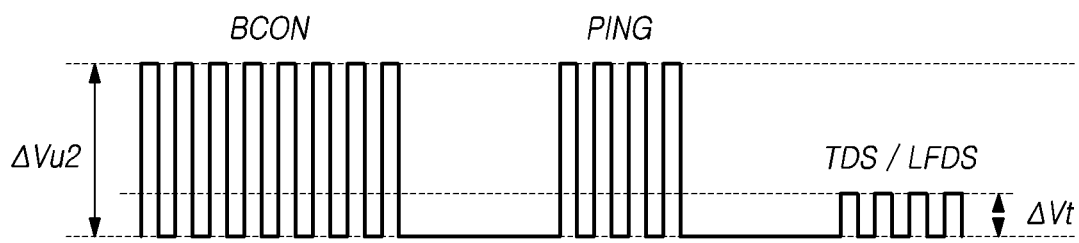

FIG. 14 illustrates an example of three driving signals, for example, a beacon signal BCON, a ping signal PING, and a touch driving signal or load-free driving signal TDS/LFDS according to amplitude control of an uplink signal ULS in a touch display device 100 according to embodiments of the disclosure.

Referring to FIG. 14, three driving signals can include a beacon signal BCON, which is a type of uplink signal ULS, and a ping signal PING, which is another type of uplink signal ULS, and can further include a touch driving signal TDS for sensing a finger touch, and can further include a load-free driving signal LFDS corresponding to the touch driving signal TDS.

The touch driving circuit 160 can output the touch driving signal TDS to at least one of a plurality of touch electrodes TE at a different timing (finger sensing period) from the timing (beacon transmission period, ping transmission period) for outputting the uplink signal ULS.

Referring to FIG. 14, the amplitude ΔVu1 of the uplink signal ULS output before receiving the downlink signal DLS can correspond to the amplitude ΔVt of the touch driving signal TDS. The amplitude ΔVu2 of the uplink signal ULS output after receiving the downlink signal DLS can be larger than the amplitude ΔVt of the touch driving signal TDS.

In other words, in the first mode MODE 1, the amplitude ΔVu1 of the uplink signal ULS can correspond to the amplitude ΔVt of the touch driving signal TDS. In the second mode MODE 2, the amplitude ΔVu2 of the uplink signal ULS can be larger than the amplitude ΔVt of the touch driving signal TDS.

Figure 15:
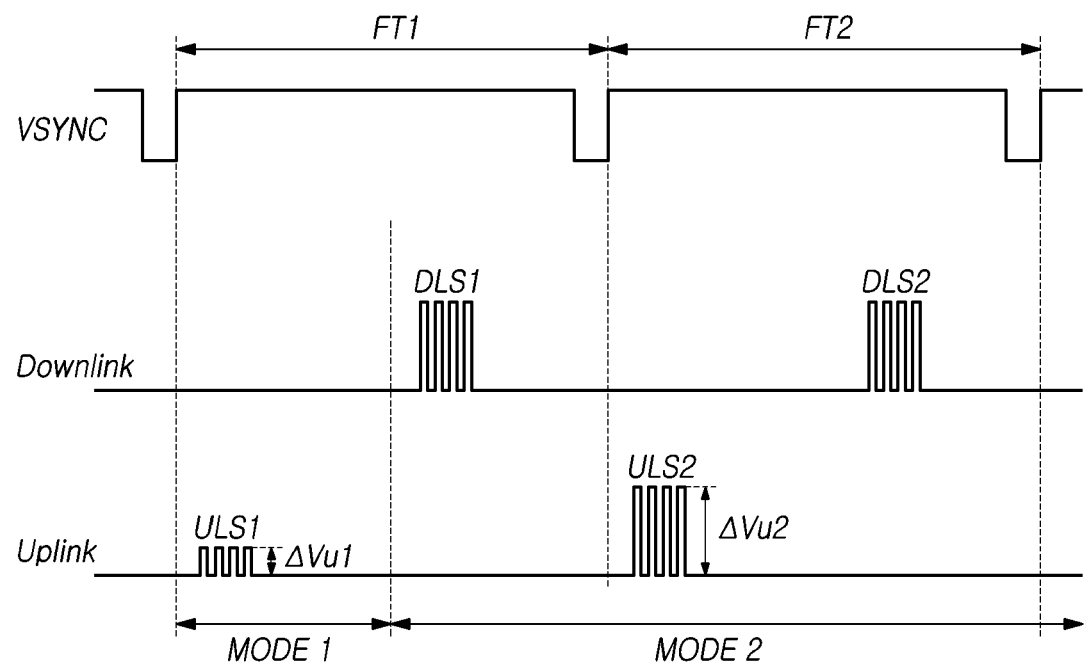
FIG. 15 illustrates an example of amplitude control of an uplink signal in a touch display device according to embodiments of the disclosure.

FIG. 15 illustrates an example of amplitude control of an uplink signal ULS in a touch display device 100 according to embodiments of the disclosure.

Referring to FIG. 15, during a first period, the touch driving circuit 160 can output an uplink signal ULS (for example, a first uplink signal ULS1) having a first amplitude ΔVu1. Here, the first period can be a period during which the downlink signal DLS is not received for more than a predetermined time. For example, If the downlink signal DLS is not received again for a predetermined period of time from the time when the downlink signal DLS is received (i.e., when the pen 10 disappears), the first period can start from this time.

During a second period after the first period, the touch driving circuit 160 can receive the downlink signal DLS (for example, a first downlink signal DLS1).

During a third period after the second period, the touch driving circuit 160 can output the uplink signal ULS (for example, a second uplink signal ULS2) having the second amplitude ΔVu2 larger than the first amplitude ΔVu1.

The first period can be a period included in a first display frame period FT1, and can be, e.g., a touch driving period TP allocated as a beacon transmission period or a ping transmission period.

The second period can be a period included in the first display frame period FT1 or a second display frame period FT2, and can be, e.g., a touch driving period TP allocated to a period (e.g., a pen position sensing period or a pen data sensing period) during which the downlink signal DLS is received.

The third period can be a period included in the first display frame period FT1 or the second display frame period FT2, and can be, e.g., a touch driving period TP allocated as a beacon transmission period or a ping transmission period.

When the downlink signal DLS (for example, a second downlink signal DLS2) is not received again for a predetermined time after the third period, the touch driving circuit 160 can be configured to output the uplink signal ULS having an amplitude (e.g., a first amplitude or an amplitude slightly larger or smaller than the first amplitude) smaller than the second amplitude ΔVu2.

Hereinabove, the amplitude control technique has been described as the control technique of the uplink signal ULS according to embodiments of the disclosure, and the frequency control technique is described below.

Figure 16:
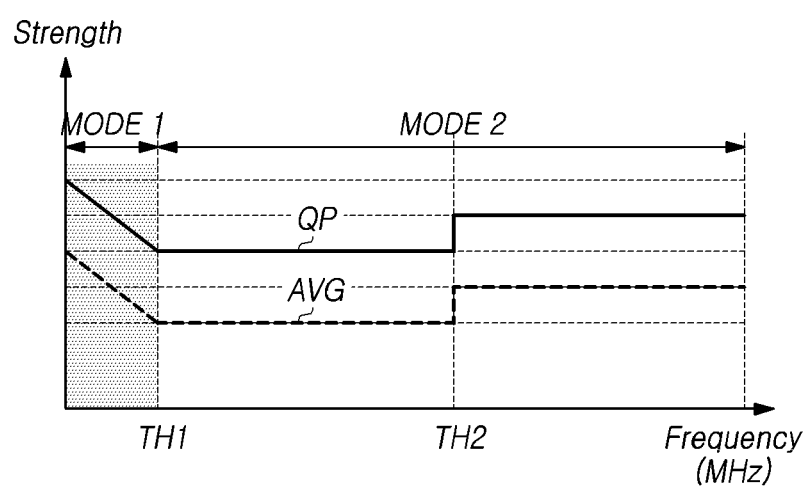
FIG. 16 is a graph illustrating an example of frequency control of an uplink signal in a touch display device according to embodiments of the disclosure.
Figure 17:
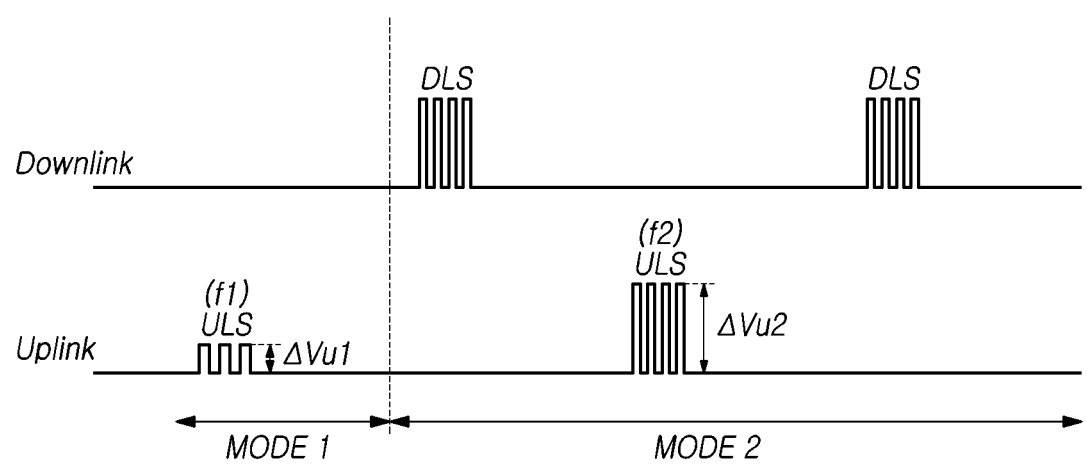
FIG. 17 illustrates an example of amplitude and frequency control of an uplink signal in a touch display device according to embodiments of the disclosure.

FIG. 16 illustrates an example of frequency control of an uplink signal ULS in a touch display device 100 according to embodiments of the disclosure. FIG. 17 illustrates an example of amplitude and frequency control of an uplink signal ULS in a touch display device 100 according to embodiments of the disclosure.

The graph of FIG. 16 is a graph showing signal strength of an uplink signal ULS according to frequency (unit: MHz).

In the graph, the signal strength of the uplink signal ULS according to the frequency is expressed as a quasi-peak value QP and an average value AVG.

Referring to FIG. 16, when the frequency of the uplink signal ULS is lower than a first threshold frequency TH1, the signal strength of the uplink signal ULS can increase.

Referring to FIG. 16, when the frequency of the uplink signal ULS is higher than the first threshold frequency TH1 but equal to or lower than a second threshold frequency TH2 that is higher than the first threshold frequency TH1 of the uplink signal ULS, the signal strength of the uplink signal ULS can remain constant. When the frequency of the uplink signal ULS is higher than the second threshold frequency TH2, the signal strength of the uplink signal ULS can be increased and can be maintained at a predetermined value.

Meanwhile, when the driving mode is the first mode MODE 1 in which there is no pen 10 or no pen touch, the amplitude of the uplink signal ULS may not be set to be too small considering the possibility that the pen 10 suddenly appears. Considering that the signal strength of the uplink signal ULS increases when the frequency of the uplink signal ULS is lowered, the touch display device 100 can output reduce the amplitude of the uplink signal ULS and output the uplink signal ULS. Accordingly, electromagnetic interference EMI caused by the uplink signal ULS can be mitigated.

In other words, when the frequency control technique of the uplink signal ULS is performed, the touch display device 100 according to embodiments of the disclosure can increase the frequency (driving frequency) of the uplink signal ULS in the second mode MODE 2 and decrease the frequency (driving frequency) of the uplink signal ULS in the first mode MODE 1. Accordingly, electromagnetic interference EMI can be reduced in the first mode MODE 1.

Referring to FIG. 17, before receiving the downlink signal DLS, the uplink signal ULS output from the touch driving circuit 160 can have a first frequency f1 or a first bitrate.

After receiving the first downlink signal DLS, the uplink signal ULS output from the touch driving circuit 160 can have a second frequency f2 or a second bitrate. Here, the first frequency f1 can be lower than the second frequency f2. The first bitrate can be lower than the second bitrate.

The touch display device 100 according to the above-described embodiments of the disclosure can be a liquid crystal display device or a self-luminous display device. The self-luminous display device can be a display device in which a light emitting element is disposed in each sub-pixel SP so that the display panel 110 can emit light. For example, the self-luminous display device can be an organic light-emitting diode display device in which a light-emitting element in each sub-pixel SP is an organic light-emitting diode (OLED), a light-emitting diode display device in which a light-emitting element in each sub-pixel SP is an inorganic light-emitting diode (LED), or a quantum dot display device in which a light-emitting element in each sub-pixel SP emits light using a quantum dot.

Hereinafter, when the touch display device 100 according to embodiments of the disclosure is a liquid crystal display device and when the touch display device 100 is a self-luminous display device are briefly described.

Figure 18:
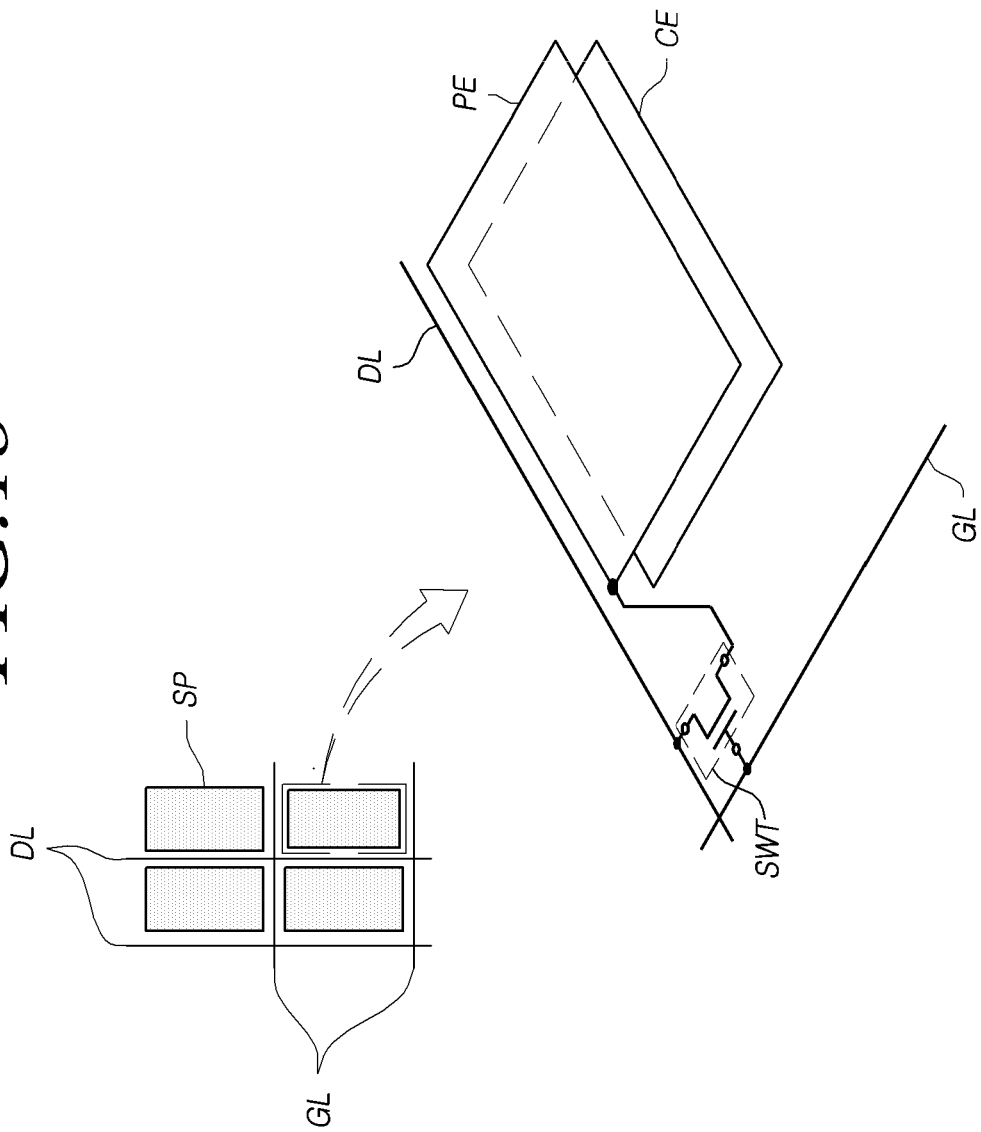
FIG. 18 illustrates a subpixel structure when a display panel of a touch display device is a liquid crystal display panel according to embodiments of the disclosure.
Figure 19:
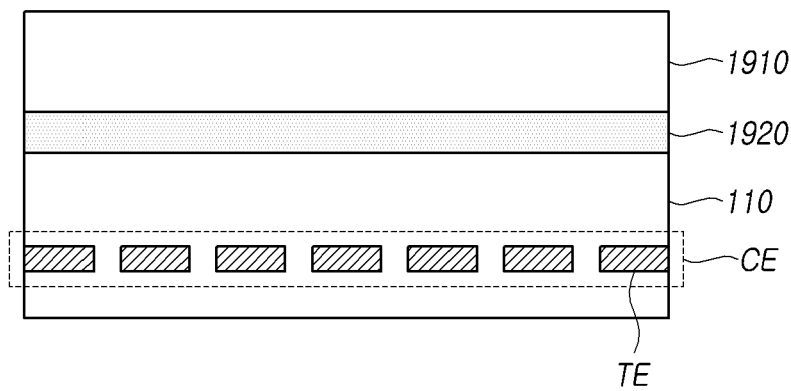
FIG. 19 is a cross-sectional view illustrating a structure in which a touch sensor is embedded in a display panel when the display panel is a liquid crystal display panel according to embodiments of the disclosure.

FIG. 18 illustrates a subpixel structure when a display panel 110 of a touch display device 100 is a liquid crystal display panel 110 according to embodiments of the disclosure. FIG. 19 is a cross-sectional view illustrating a structure in which a touch sensor is embedded in a display panel 110 when the display panel 110 is a liquid crystal display panel 110 according to embodiments of the disclosure.

Referring to FIG. 18, when the display panel 110 is a liquid crystal display panel, each of the plurality of subpixels SP disposed on the display panel 110 can be connected to a data line DL and a gate line GL.

Referring to FIG. 18, the display panel 110 can include a common electrode CE to which a common voltage is applied, and the common electrode CE can be disposed in the area in which all subpixels SP are disposed. The pixel electrode PE can be disposed in each subpixel SP, and the pixel electrode PE and the common electrode CE can be disposed to be spaced apart from each other by a predetermined distance.

Each subpixel SP can include a pixel electrode PE and a switching transistor SWT. The switching transistor SWT can include a gate electrode to which the gate line GL is connected, a source electrode (or a drain electrode) connected to the data line DL, and a drain electrode (or a source electrode) connected to the pixel electrode PE.

When the switching transistor SWT is turned on, the data voltage supplied from the data line DL can be applied to the pixel electrode PE through the switching transistor SWT. Accordingly, a capacitance can be formed between the common electrode CE to which the common voltage is applied and the pixel electrode PE to which the data voltage is applied.

Referring to FIG. 19, when the display panel 110 is the liquid crystal display panel, the common electrode CE can be utilized as the touch sensor embedded in the display panel 110. The common electrode CE can be divided into a plurality of sub-common electrodes, and the plurality of sub-common electrodes can serve as a plurality of touch electrodes TE.

Referring to FIG. 19, a cover glass 1910 can be disposed on the display panel 110, and a bonding layer 1920 can be disposed between the display panel 110 and the cover glass 1910.

Since the common electrode CE serves as a display driving electrode to which a common voltage is applied and serves as a touch sensor, a common voltage can be applied to the plurality of touch electrodes TE during the display driving period DP for displaying an image, and the driving signals BCON, PING, and TDS/LFDS of FIG. 14 can be applied to at least one of the plurality of touch electrodes TE during the touch driving period TP.

Figure 20:
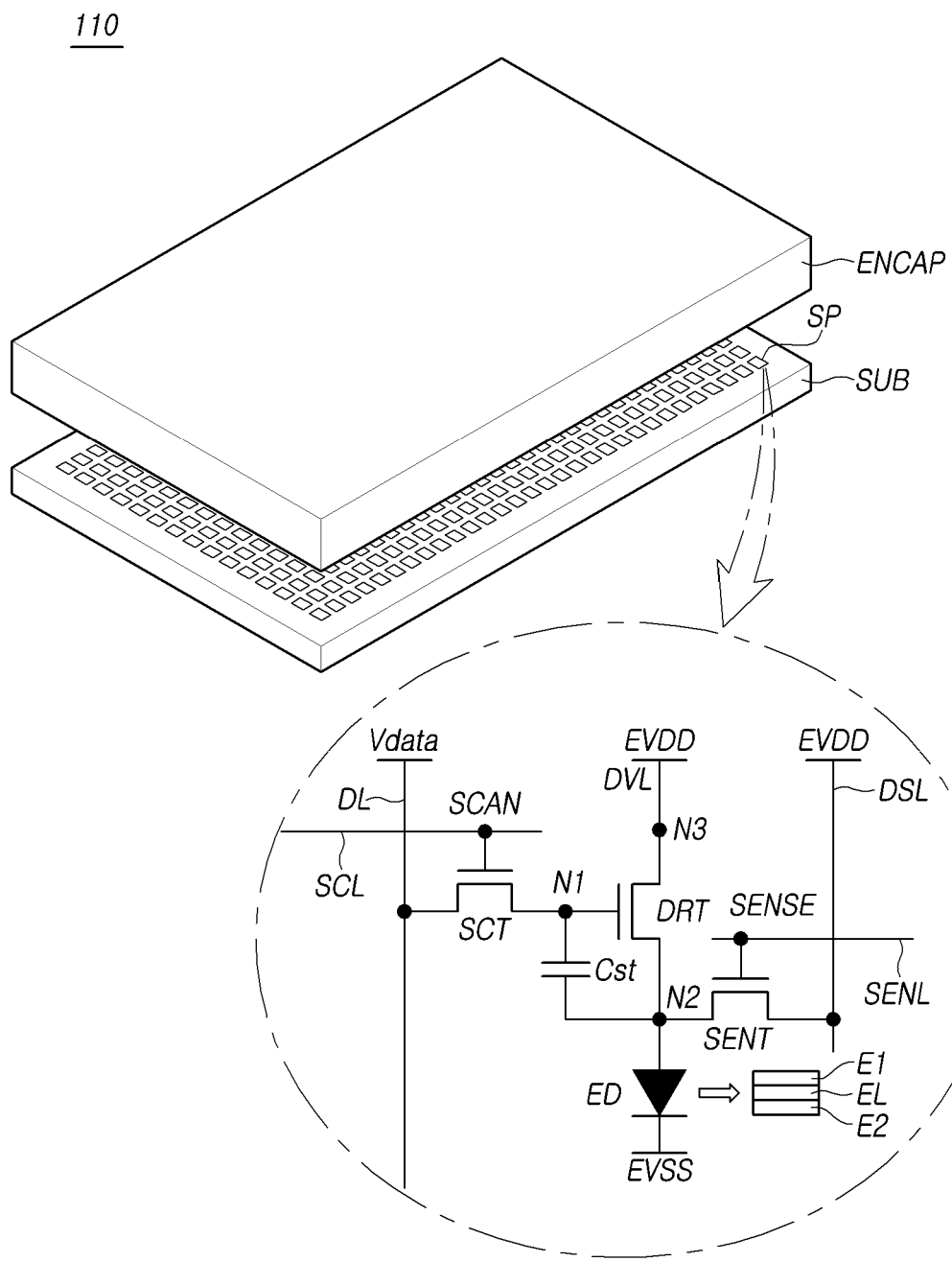
FIG. 20 is a diagram illustrating a structure of a display panel of a touch display device and a subpixel structure when the display panel is a self-luminous display panel according to embodiments of the disclosure.

FIG. 20 is a diagram illustrating a structure of a display panel 110 of a touch display device 100 and a subpixel structure when the display panel 110 is a self-luminous display panel 110 according to embodiments of the disclosure.

Referring to FIG. 20, the display panel 110 can include a plurality of subpixels SP formed on the substrate SUB. Each of the plurality of subpixels SP can include a light emitting element ED and a driving transistor DRT for driving the light emitting element ED.

Each of the plurality of subpixels SP can further include a scanning transistor SCT for transferring the data signal Vdata to the first node N1 of the driving transistor DRT, and a storage capacitor Cst for maintaining a constant voltage for one frame.

Each of the plurality of subpixels SP can further include a sensing transistor SENT for sensing the voltage of the second node N2 of the driving transistor DRT.

The driving transistor DRT can include a first node N1 to which the data signal Vdata can be applied, a second node N2 electrically connected to the light emitting element ED, and a third node N3 to which the first power signal EVDD is applied from the first power line DVL. The first node N1 in the driving transistor DRT can be a gate node, the second node N2 can be a source node or a drain node, and the third node N3 can be the drain node or the source node.

The light emitting element (or light emitting device) ED can include a first electrode E1, a light emitting layer EL, and a second electrode E2. The first electrode E1 can be disposed in each subpixel SP, and can be electrically connected to the second node N2 of the driving transistor DRT of each subpixel SP. The second electrode E2 can be commonly disposed in the plurality of subpixels SP, and the second power signal EVSS can be applied thereto. The first electrode E1 can be a pixel electrode, and the second electrode E2 can be a common electrode.

For example, the first electrode E1 can be an anode electrode, and the second electrode E2 can be a cathode electrode. Conversely, the first electrode E1 can be a cathode electrode, and the second electrode E2 can be an anode electrode. Hereinafter, for convenience of description, it is assumed that the first electrode E1 is an anode electrode and the second electrode E2 is a cathode electrode. Accordingly, the first electrode E1 can be referred to as an anode electrode, and the second electrode E2 can be referred to as a cathode electrode. The second power supply signal EVSS applied to the second electrode E2 is a type of display driving voltage.

For example, the light emitting element ED can be an organic light emitting diode (OLED), an inorganic light emitting diode, or a quantum dot light emitting diode. In this case, when the light emitting element ED is an organic light emitting diode, the light emitting layer EL of the light emitting element ED can include an organic light emitting layer including an organic material.

The scanning transistor SCT can be controlled to be turned on and off by the scanning gate signal SCAN supplied from the scanning gate line SCL to control the connection between the first node N1 of the driving transistor DRT and the corresponding data line DL.

When the scanning transistor SCT is turned on, the data voltage Vdata supplied to the data line DL can be applied to the first node N1 of the driving transistor DRT.

The sensing transistor SENT can be controlled to be turned on and off by the sensing gate signal SENSE supplied from the sensing gate line SENL, and can control connection between the second node N2 of the driving transistor DRT and the display sensing line DSL.

The sensing gate line SENL can be a gate line different from the scanning gate line SCL, or can be the same gate line as the scanning gate line SCL.

When the sensing transistor SENT is turned on, the reference voltage Vref supplied to the display sensing line DSL can be applied to the second node N2 of the driving transistor DRT.

The storage capacitor Cst can be electrically connected between the first node N1 and second node N2 of the driving transistor DRT.

The storage capacitor Cst can be an external capacitor intentionally designed to be outside the driving transistor DRT, but not a parasitic capacitor (e.g., Cgs or Cgd) which is an internal capacitor that can be present between the first node N1 and the second node N2 of the driving transistor DRT.

Each of the driving transistor DRT, the scanning transistor SCT, and the sensing transistor SENT can be an n-type transistor or a p-type transistor.

As illustrated in FIG. 20, each subpixel SP can have a 2T (Transistor)1C (Capacitor) structure including two transistors (for example, a driving transistor DRT and a scanning transistor SCT) and one capacitor (for example, a storage capacitor Cst), and in some cases, can further include one or more transistors or can further include one or more capacitors.

Since circuit elements (especially the light emitting element ED) in each subpixel SP are vulnerable to external moisture or oxygen, the display panel 110 can further include an encapsulation layer ENCAP. The encapsulation layer ENCAP can prevent external moisture or oxygen from penetrating into circuit elements (especially the light emitting element ED).

The encapsulation layer ENCAP can be disposed on the second electrode E2. The encapsulation layer ENCAP can have a single layer structure and can have a multilayer structure including several sub-encapsulation layers. For example, the encapsulation layer ENCAP can have a multilayer structure in which an inorganic encapsulation layer, an organic encapsulation layer, and an inorganic encapsulation layer are stacked.

Figure 21A:
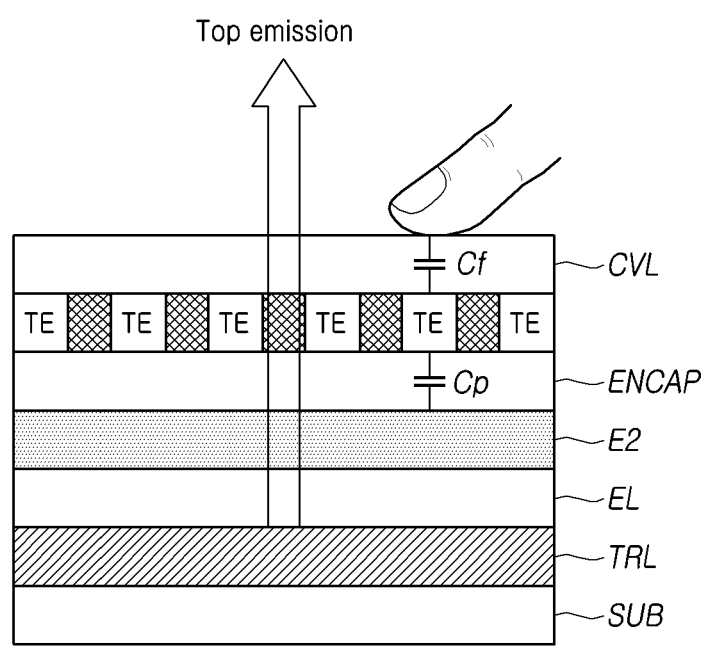
FIGS. 21A, 21B, and 21C are cross-sectional views illustrating a structure in which a touch sensor is embedded in a display panel when the display panel is a self-luminous display panel according to embodiments of the disclosure.
Figure 21B:
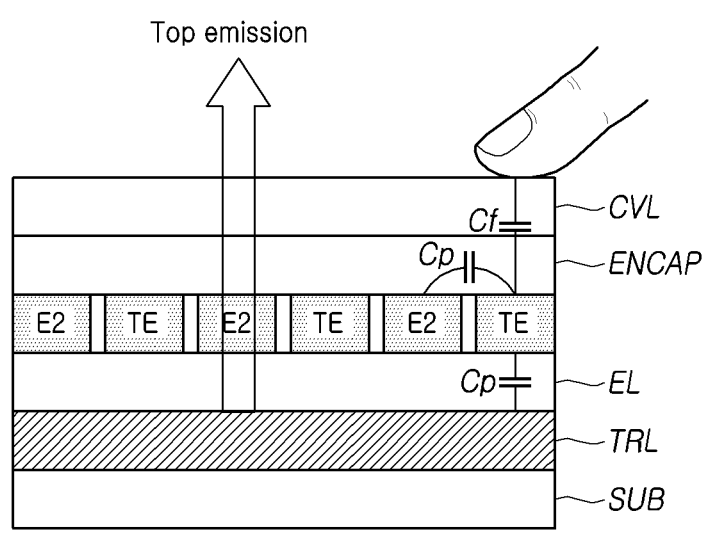
Figure 21C:
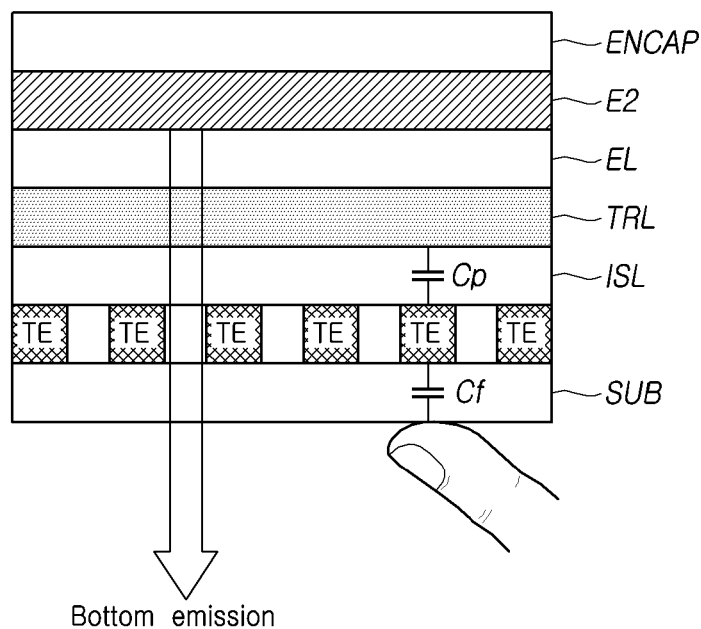

FIGS. 21A, 21B, and 21C are cross-sectional views illustrating a structure in which a touch sensor is embedded in a display panel 110 when the display panel 110 is a self-luminous display panel 110 according to embodiments of the disclosure.

Referring to FIGS. 21A, 21B, and 21C, the display panel 110 can include a substrate SUB, a transistor forming layer TRL on the substrate SUB, a light emitting layer EL on the transistor forming layer TRL, a second electrode E2 on the light emitting layer EL, and an encapsulation layer ENCAP on the second electrode E2.

Referring to FIGS. 21A, 21B, and 21C, driving transistors DRT, scanning transistors SCT, and sensing transistors SENT can be disposed in the transistor forming layer TRL. Also, the first electrodes E1 connected to the second nodes N2 of the driving transistors DRT can be disposed in the transistor forming layer TRL. Various signal lines, for example, the data line DL, the gate line GL, the first power line DVL, and the display sensing line DSL, can also be disposed in the transistor forming layer TRL.

Referring to FIGS. 21A, 21B, and 21C, the light emitting layer EL can be disposed in the area of each of the plurality of subpixels SP and can be positioned on the first electrode E1. The second electrode E2 can be an electrode to which the second power signal Vss corresponding to the common voltage is applied.

As illustrated in FIGS. 21A and 21B, the display panel 110 can have a top emission structure that emits light in a direction opposite to the substrate SUB. When the display panel 110 has the top emission structure, the first electrodes E1 disposed on the transistor forming layer TRL can be a reflective metal, and the second electrode E2 can be a transparent electrode. When the display panel 110 has the top emission structure, the display panel 110 can include a cover layer CVL on the touch electrodes TE.

As illustrated in FIG. 21C, the display panel 110 can have a bottom emission structure that emits light toward the substrate SUB. When the display panel 110 has the bottom emission structure, the first electrodes E1 disposed on the transistor forming layer TRL can be a transparent metal, and the second electrode E2 can be a reflective metal.

Hereinafter, a structure in which a touch sensor is embedded in the display panel 110 is described in more detail with reference to FIGS. 21A, 21B, and 21C.

Referring to FIG. 21A, when a touch sensor is embedded in the display panel 110 having the top emission structure, the touch sensor can be disposed on the encapsulation layer ENCAP. In other words, a plurality of touch electrodes TE included in the touch sensor embedded in the display panel 110 can be disposed on the encapsulation layer ENCAP.

When the plurality of touch electrodes TE embedded in the display panel 110 are disposed on the encapsulation layer ENCAP, the display panel 110 can include one second electrode E2 as a common electrode. A plurality of touch electrodes TE disposed on the encapsulation layer ENCAP can overlap the second electrode E2 disposed under the encapsulation layer ENCAP.

When the touch display device 100 performs self-capacitance-based touch sensing, the touch display device 100 can sense a touch based on the finger capacitance Cf formed between the touch electrode TE and the user's finger.

In this case, the parasitic capacitance Cp can be formed between the touch electrode TE and the second electrode E2. Here, the finger capacitance Cf is a capacitance required for touch sensing, but the parasitic capacitance Cp is an unnecessary capacitance that reduces touch sensitivity.

Referring to FIG. 21B, when a touch sensor is embedded in the display panel 110 having the top emission structure, the touch sensor can be disposed under the encapsulation layer ENCAP. In other words, a plurality of touch electrodes TE included in the touch sensor embedded in the display panel 110 can be disposed under the encapsulation layer ENCAP.

When the touch sensor embedded in the display panel 110 is disposed under the encapsulation layer ENCAP, the display panel 110 can include a plurality of second electrodes E2 as a common electrode, and the plurality of touch electrodes TE can be positioned on the sides of the plurality of second electrodes E2. In other words, each of the plurality of touch electrodes TE can be positioned between the plurality of second electrodes E2 (specially, each of the plurality of touch electrodes TE may be positioned between two adjacent second electrodes E2).

The plurality of touch electrodes TE can be formed of the same metal material as the plurality of second electrodes E2. For example, the cathode metal can be patterned to form a plurality of touch electrodes TE and a plurality of second electrodes E2.

The plurality of touch electrodes TE can overlap one or more of at least one first electrode E1, at least one data line DL, and at least one gate line GL.

When the touch display device 100 performs self-capacitance-based touch sensing, a finger capacitance Cf can be formed between the touch electrode TE and the user's finger. In this case, the parasitic capacitance Cp can be formed between the touch electrode TE and the second electrode E2. The parasitic capacitance Cp can be formed between the touch electrode TE and the electrode or line of the transistor forming layer TRL.

The electrode or line formed in the transistor forming layer TRL can include one or more of the first electrode E1, the data line DL, the gate line GL, the first power line DVL, the second power line BVL, the display sensing line DSL, and the like. The electrode or line formed in the transistor forming layer TRL can include a pixel electrode material, a source drain material, a gate material, or the like.

Referring to FIG. 21C, when a touch sensor is embedded in the display panel 110 having the bottom emission structure, the touch sensor can be disposed under the second electrode E2. In other words, a plurality of touch electrodes TE included in the touch sensor embedded in the display panel 110 can be disposed under the second electrode E2.

Referring to FIG. 21C, when a plurality of touch electrodes TE embedded in the display panel 110 are disposed under the second electrode E2, the plurality of touch electrodes TE can be disposed under the transistor forming layer TRL. In this case, the insulation layer ISL can be disposed between the plurality of touch electrodes TE and the transistor forming layer TRL.

Alternatively, when the plurality of touch electrodes TE embedded in the display panel 110 are disposed under the second electrode E2, the plurality of touch electrodes TE can be disposed on or above the transistor forming layer TRL. For example, the plurality of touch electrodes TE can be formed of the same material as the plurality of first electrodes E1. In other words, the plurality of touch electrodes TE can be disposed on the same layer as the plurality of first electrodes E1.

As described above, the plurality of touch electrodes TE embedded in the display panel 110 can be disposed on the encapsulation layer ENCAP, can be disposed between electrodes into which the second electrode E2 is divided, or can be disposed under the second electrode E2.

Figure 22:
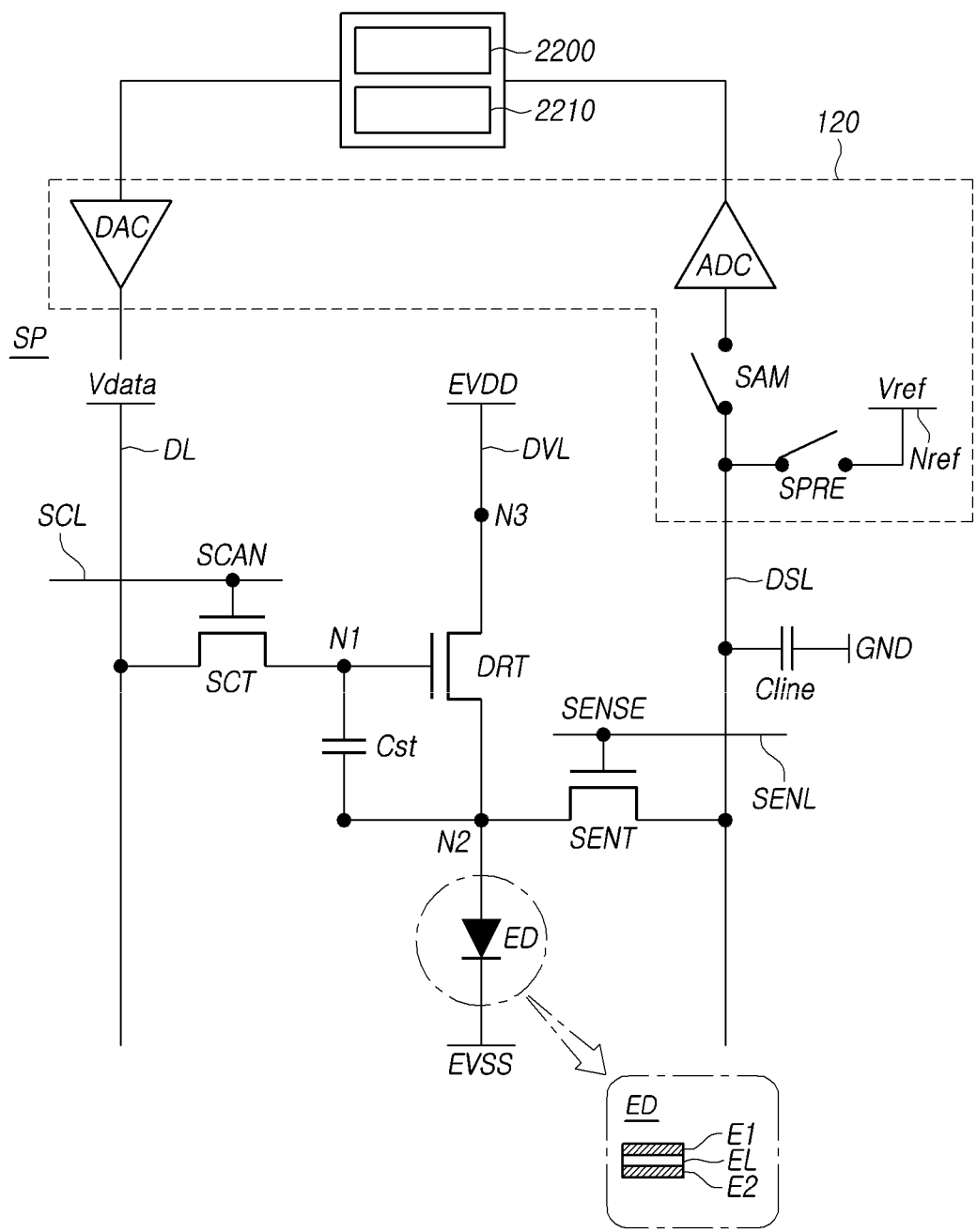
FIG. 22 illustrates a compensation circuit for compensating for characteristic value deviations between subpixels when a display panel is a self-luminous display panel according to embodiments of the disclosure.

FIG. 22 illustrates an example of a compensation circuit for compensating for characteristic value deviations between subpixels SP when a display panel 110 is a self-luminous display panel 110 according to embodiments of the disclosure.

Referring to FIG. 22, the compensation circuit is a circuit capable of sensing and compensation processing on characteristic values of circuit elements, such as the driving transistor DRT and light emitting element ED, in the subpixel SP.

The compensation circuit can be connected to the subpixel SP and can include a power switch SPRE, a sampling switch SAM, an analog-to-digital converter ADC, and a compensator 2200.

The power switch SPRE can control the connection between the display sensing line DSL and the reference voltage supply node Nref. The reference voltage Vref output from the power supply can be supplied to the reference voltage supply node Nref, and the reference voltage Vref supplied to the reference voltage supply node Nref can be applied to the display sensing line DSL through the power switch SPRE.

The sampling switch SAM can control connection between the analog-to-digital converter ADC and the display sensing line DSL. If connected to the display sensing line DSL by the sampling switch SAM, the analog-to-digital converter ADC can convert the voltage (analog voltage) of the connected display sensing line DSL into a display sensing value corresponding to a digital value.

Aline capacitor Cline can be formed between the display sensing line DSL and the ground GND. The voltage of the display sensing line DSL can correspond to a charge amount of the line capacitor Cline.

The analog-to-digital converter ADC can provide display sensing data including the display sensing value to the compensator 2200.

The compensator 2200 can identify the characteristic value of the light emitting element ED or the driving transistor DRT included in the corresponding sub pixel SP based on the display sensing data, calculate a compensation value, and store the calculated compensation value in the memory 2210.

For example, the compensation value is information for reducing a deviation in characteristic value between the light emitting elements ED or a deviation in characteristic value between the driving transistors DRT and can include an offset and a gain value for data change.

The display controller 140 can change the image data using the compensation value stored in the memory 2210 and can supply the changed image data to the data driving circuit 120.

The data driving circuit 120 can convert the changed image data into a data voltage Vdata corresponding to the analog voltage using the digital-to-analog converter DAC and output the data voltage Vdata. Accordingly, compensation can be realized.

Referring to FIG. 22, the analog-to-digital converter ADC, the power switch SPRE, and the sampling switch SAM can be included in the data driving circuit 120. The compensator 2200 can be included in the display controller 140.

As described above, the touch display device 100 according to embodiments of the disclosure can perform compensation processing to reduce the characteristic value deviation between the driving transistors DRT. Further, the touch display device 100 can perform display sensing driving for identifying the characteristic value deviation between the driving transistors DRT to perform compensation processing.

Meanwhile, the sensing driving for sensing the mobility of the driving transistor DRT can take a shorter time than the sensing driving for sensing the threshold voltage of the driving transistor DRT. Accordingly, sensing driving for sensing the mobility of the driving transistor DRT can be performed during the vertical blank period VB.

Figure 23:
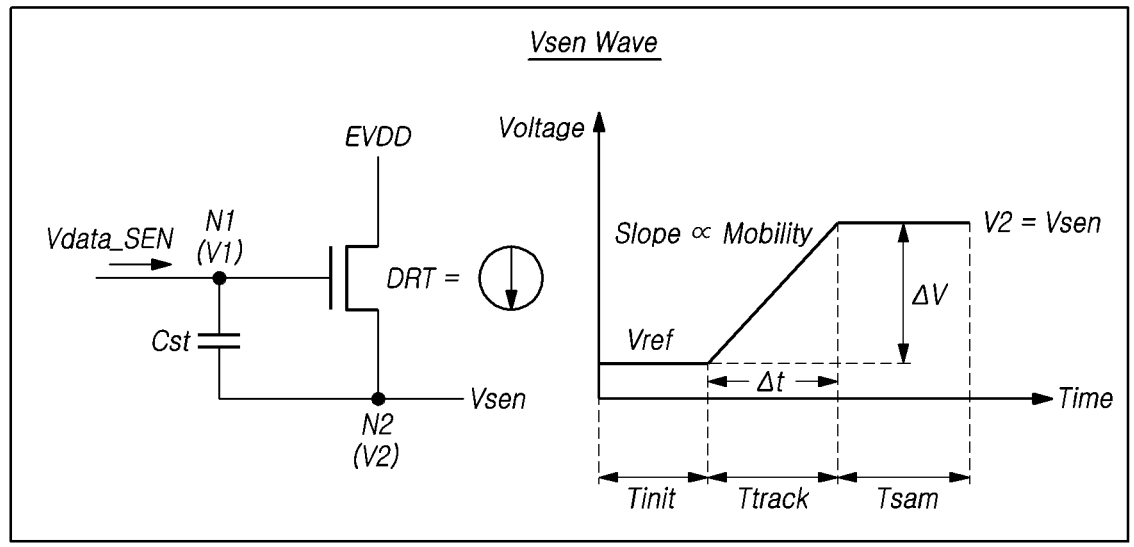
FIG. 23 illustrates an example of amplitude control of an uplink signal when a display panel is a self-luminous display panel according to embodiments of the disclosure.
Figure 23:
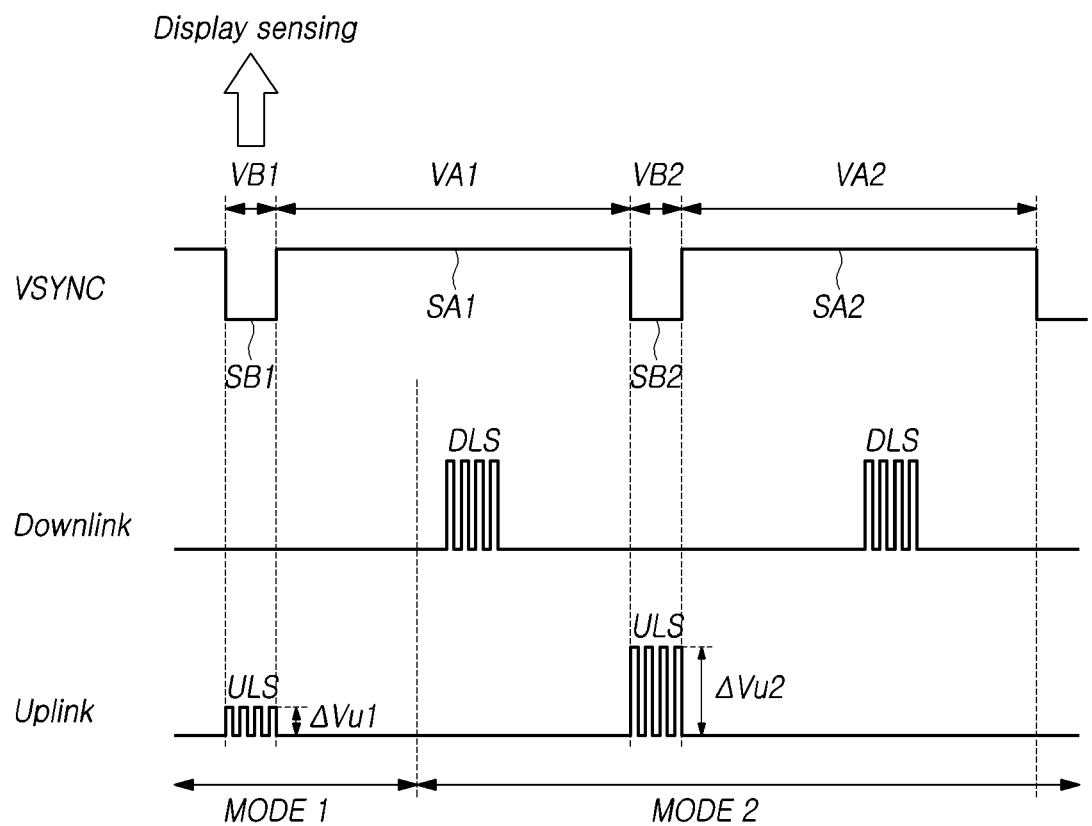

FIG. 23 exemplarily illustrates amplitude control of an uplink signal USL when a display panel 110 is a self-luminous display panel according to embodiments of the disclosure.

Referring to FIG. 23, in order to freely control the amplitude of the uplink signal ULS or the amount of information included in the uplink signal ULS, the touch driving circuit 160 can output the uplink signal ULS during vertical blank periods VB1 and VB2.

Referring to FIG. 23, the vertical synchronization signal VSYNC can sequentially include a first vertical blank signal section SB1 having a first signal level, a first vertical active signal section SA1 having a second signal level different from the first signal level, a second vertical blank signal section SB2 having the first signal level, and a second vertical active signal section SA2 having the second signal level.

It is assumed that the touch driving circuit 160 receives the downlink signal DLS during the first vertical active period VA1 corresponding to the first vertical active signal period SA1. According to this example, before the downlink signal DLS is received, the driving mode can be the first mode MODE 1, and after the downlink signal DLS is received, the driving mode can be changed to the second mode MODE 2.

According to the example of FIG. 23, during the first vertical blank period VB1 corresponding to the first vertical blank signal section SB1, the touch driving circuit 160 can output the uplink signal ULS having the first amplitude ΔVu1.

During the second vertical blank period VB2 corresponding to the second vertical blank signal section SB2, the touch driving circuit 160 can output an uplink signal ULS having a second amplitude ΔVu2 larger than the first amplitude ΔVu1.

During the first vertical blank period VB1, display sensing driving can be performed. Accordingly, the display sensing circuit can be configured to sense characteristic values of the light emitting element ED or the transistors such as the driving transistor DRT, the scanning transistor SCT, and the sensing transistor SENT included in at least one of the plurality of subpixels SP during the first vertical blank period VB. Here, the display sensing can be a mobility sensing driving of the driving transistor DRT.

During the first vertical blank period VB1, an uplink signal ULS having a small first amplitude ΔVu1 can be applied to the touch electrode TE. Accordingly, during the first vertical blank period VB1, electromagnetic interference EMI can be reduced.

Therefore, during the first vertical blank period VB1, the display sensing line DSL or the display sensing circuit involved in display sensing driving can be less affected by the electromagnetic interference EMI. Here, the display sensing circuit can include an analog-to-digital converter (ADC), a data driving circuit 120, a compensator 2200, and the like.

Accordingly, during display sensing performed during the first vertical blank period VB1, an accurate sensing value and compensation value can be obtained.

When the driving mode is the second mode MODE 2 after the downlink signal DLS is received, during the second vertical blank period VB2, the touch driving circuit 160 can output the uplink signal ULS having the second amplitude ΔVu2 larger than the first amplitude ΔVu1. During the second vertical blank period VB2, display sensing driving may not be performed in consideration of the electromagnetic interference EMI.

Referring to FIG. 23, display sensing driving is briefly described.

The display sensing period can include an initialization period Tinit, a tracking period Ttrack, and a sampling period Tsam.

The initialization period Tinit of the display sensing period is a period for initializing the first node N1 and the second node N2 of the driving transistor DRT.

During the initialization period Tinit, the scanning transistor SCT and the sensing transistor SENT can be turned on, and the power switch SPRE can be turned on.

During the initialization period Tinit, the voltage V1 of the first node N1 of the driving transistor DRT can be initialized to the data voltage Vdata_SEN for display sensing driving, and the voltage V2 of the second node N2 of the driving transistor DRT can be initialized to the reference voltage Vref for sensing driving.

The tracking period Ttrack of the display sensing driving period is a period during which the voltage V2 of the second node N2 of the driving transistor DRT is changed during a preset tracking time Δt until the voltage V2 of the second node N2 of the driving transistor DRT becomes a voltage state of reflecting the mobility of the driving transistor DRT or a change in mobility.

During the tracking period Ttrack, the preset tracking time Δt can be set to be short. Accordingly, during the short tracking time Δt, it is hard for the voltage V2 of the second node N2 of the driving transistor DRT to reflect the threshold voltage Vth. However, during the short tracking time Δt, the voltage V2 of the second node N2 of the driving transistor DRT can be changed in such an extent as to be able to figure out the mobility of the driving transistor DRT.

In the tracking period Ttrack, as the power switch SPRE is turned off or the sensing transistor SENT is turned off, the second node N2 of the driving transistor DRT can become an electrically floating state.

During the tracking period Ttrack, by the scanning gate signal SCAN of the turn-off level voltage, the scanning transistor SCT can be in a turned-off state, and the first node N1 of the driving transistor DRT can be in a floating state.

During the initialization period Tinit, the voltage difference between the first node N1 and second node N2 of the initialized driving transistor DRT can be the threshold voltage Vth of the driving transistor DRT or more. Accordingly, when the tracking period Ttrack starts, the driving transistor DRT is in a turn-on state and conducts current.

If the first node N1 and second node N2 of the driving transistor DRT are the gate node and source node, respectively, the voltage difference between the first node N1 and second node N2 of the driving transistor DRT becomes Vgs.

Accordingly, during the tracking period Ttrack, the voltage V2 of the second node N2 of the driving transistor DRT can be varied. In this case, the voltage V1 of the first node N1 of the driving transistor DRT can also be varied. Here, e.g., the variation of the voltage V2 of the second node N2 and the voltage V1 of the first node N2 in the driving transistor DRT can mean an increase or decrease in voltage over time. However, in the description of FIG. 5, the voltage V2 of the second node N2 and the voltage V1 of the first node N2 in the driving transistor DRT is described as an increase in voltage.

During the tracking period Ttrack, the increasing rate of the voltage V2 of the second node N2 of the driving transistor DRT can vary depending on the current capability (i.e., mobility) of the driving transistor DRT. As the current capability (mobility) of the driving transistor DRT increases, the voltage V2 of the second node N2 of the driving transistor DRT can be further sharply increased.

After the tracking period Ttrack proceeds the preset tracking time Δt, i.e., after the voltage V2 of the second node N2 of the driving transistor DRT rises during the preset tracking time Δt, the sampling period Tsam can proceed.

During the tracking period Ttrack, the increasing rate ΔV/Δt of the voltage V2 of the second node N2 of the driving transistor DRT corresponds to the voltage variation ΔV of the second node N2 of the driving transistor DRT during the preset tracking time Δt. The voltage variation Δt of the second node N2 of the driving transistor DRT can correspond to the voltage variation of the display sensing line DSL.

After the tracking period Ttrack proceeds the preset tracking time Δt, the sampling period Tsam can begin. During the sampling period Tsam, the sampling switch SAM can be turned on, so that the display sensing line DSL and the analog-to-digital converter ADC can be electrically connected with each other.

The analog-to-digital converter ADC can sense the voltage of the display sensing line DSL. The voltage Vsen sensed by the analog-to-digital converter ADC can be the voltage Vref+ΔV which is the reference voltage Vref plus an increment during the preset tracking time Δt, i.e., the voltage variation Δt.

The voltage Vsen sensed by the analog-to-digital converter ADC can be the voltage of the display sensing line DSL and can be the voltage of the second node N2 electrically connected with the display sensing line DSL through the sensing transistor SENT.

In the sampling period Tsam of the display sensing period, the voltage Vsen sensed by the analog-to-digital converter ADC can vary depending on the mobility of the driving transistor DRT. As the mobility of the driving transistor DRT increases, the sensing voltage Vsen increases. As the mobility of the driving transistor DRT decreases, the sensing voltage Vsen decreases.

The touch display device 100 can figure out the mobility of the driving transistor DRT, or a change therein, in the corresponding subpixel SP based on the voltage Vsen sensed through display sensing driving, calculate the mobility compensation value of reducing or removing the mobility deviation between the driving transistors DRT, and store the calculated mobility compensation value in the memory 410.

When supplying the data voltage Vdata for display driving to the corresponding subpixel SP, the touch display device 100 can supply the data voltage Vdata changed based on the threshold voltage compensation value and the mobility compensation value.

Embodiments of the disclosure described above are briefly described below.

A touch display device according to embodiments of the disclosure can comprise a touch sensor including a plurality of touch electrodes and a touch driving circuit configured to output an uplink signal to at least one of the plurality of touch electrodes and configured to receive a downlink signal output from a pen through at least one of the plurality of touch electrodes.

The touch driving circuit can be configured to output the uplink signal having a first amplitude before receiving the downlink signal and output the uplink signal having a second amplitude larger than the first amplitude after receiving the downlink signal.

The uplink signal can be output at a timing different from a timing at which the downlink signal is received and can include a signal including pen driving control information for allowing the touch display device and the pen to interwork with each other.

The uplink signal can be output at a timing different from a timing at which the downlink signal can be received and can include a ping signal for synchronization of the downlink signal.

The touch display device can further comprise a touch power circuit configured to supply a first pulse modulated signal having the first amplitude or a second pulse modulation signal having the second amplitude to the touch driving circuit.

The touch driving circuit can be configured to output the uplink signal having the first amplitude based on the first pulse modulation signal before receiving the downlink signal, and output the uplink signal having the second amplitude based on the second pulse modulation signal after receiving the downlink signal.

The touch driving circuit can output a touch driving signal to at least one of the plurality of touch electrodes at a timing different from a timing at which the uplink signal is output.

The first amplitude of the uplink signal can correspond to an amplitude of the touch driving signal, and the second amplitude of the uplink signal can be larger than the amplitude of the touch driving signal.

The touch driving circuit can be configured to output the uplink signal having the first amplitude during a first period, receive the downlink signal during a second period after the first period, and output the uplink signal having the second amplitude during a third period after the second period.

The touch driving circuit can be configured to output the uplink signal having a first frequency or a first bitrate before receiving the downlink signal, and output the uplink signal having a second frequency or a second bitrate after receiving the downlink signal.

The first frequency can be lower than the second frequency, and the first bitrate can be lower than the second bitrate.

A display frame period can include a vertical active period and a vertical blank period, and the vertical active period can alternately include a plurality of horizontal active periods and a plurality of horizontal blank periods.

The plurality of horizontal active periods can be display driving periods, and the plurality of horizontal blank periods can be touch driving periods.

The plurality of horizontal blank periods can include at least one touch driving period for transmitting the uplink signal to the pen and two or more touch driving periods for receiving the downlink signal from the pen.

A vertical synchronization signal sequentially can include a first vertical blank signal section having a first signal level, a first vertical active signal section having a second signal level different from the first signal level, and a second vertical blank signal section having the first signal level.

The touch driving circuit can be configured to receive the downlink signal during a first vertical active period corresponding to the first vertical active signal section.

The touch driving circuit can be configured to output the uplink signal having the first amplitude during a first vertical blank period corresponding to the first vertical blank signal section.

The touch driving circuit can be configured to output the uplink signal having the second amplitude larger than the first amplitude during a second vertical blank period corresponding to the second vertical blank signal section.

The touch display device can further comprise a display sensing circuit configured to sense a characteristic value of a light emitting element or a transistor included in at least one of the plurality of subpixels during the first vertical blank period.

A driving circuit according to embodiments of the disclosure can comprise an interface receiving control information and an adjusting unit configured to, based on the control information, output a first pulse modulation signal having a first signal characteristic when a driving mode can be a first mode when no pen touch has occurred, and output a second pulse modulation signal having a second signal characteristic different from the first signal characteristic when the driving mode can be a second mode when a pen touch has occurred. The driving circuit can include the touch power circuit 1200 described above.

Each of the first signal characteristic and the second signal characteristic can include an amplitude.

Each of the first signal characteristic and the second signal characteristic can include at least one of a frequency and a bitrate.

A method for driving a touch display device according to embodiments of the disclosure can comprise determining whether a touch has occurred, determining a type of the touch when it is determined that the touch has occurred, supplying a signal corresponding to a first mode to a touch sensor when the touch does not occur or when the touch has occurred as a finger touch, and supplying a signal corresponding to a second mode different from the first mode to the touch sensor when the touch has occurred as a pen touch.

The signal corresponding to the second mode can have a signal characteristic from that of the signal corresponding to the first mode.

An amplitude of the signal corresponding to the first mode can be smaller than an amplitude of the signal corresponding to the second mode.

According to the embodiments of the disclosure described above, there can be provided a touch display device, a driving circuit, and a driving method capable of mitigating EMI while supporting pen touch functionality.

According to embodiments of the disclosure, there can be provided a touch display device, a driving circuit, and a driving method capable of mitigating EMI by reducing the amplitude of the uplink signal when no pen touch has occurred.

According to embodiments of the disclosure, there can be provided a touch display device, a driving circuit, and a driving method capable of further mitigating EMI by reducing the frequency of the uplink signal when no pen touch has occurred.

According to embodiments of the disclosure, there can be provided a touch display device, a driving circuit, and a driving method capable of reducing power consumption through low-voltage driving for reducing the amplitude of the uplink signal when no pen touch has occurred.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the disclosure. The above description and the accompanying drawings provide an example of the technical idea of the disclosure for illustrative purposes only. For example, the disclosed embodiments are intended to illustrate the scope of the technical idea of the disclosure.

What is claimed:

1. A touch display device, comprising:
   a touch sensor including a plurality of touch electrodes; and
   a touch driving circuit configured to output an uplink signal to at least one of the plurality of touch electrodes, and receive a downlink signal output from a pen through at least one of the plurality of touch electrodes,
   wherein the touch driving circuit is configured to:
   output the uplink signal having a first amplitude during a first period;
   receive the downlink signal during a second period after the first period;
   output the uplink signal having a second amplitude during a third period after the second period; and
   output the uplink signal having an amplitude smaller than the second amplitude if the downlink signal is not received again for a predetermined time after the third period.

2. The touch display device of claim 1, wherein the uplink signal is output at a timing different from a timing at which the downlink signal is received, and includes a beacon signal including pen driving control information for allowing the touch display device and the pen to interwork with each other.

3. The touch display device of claim 1, wherein the uplink signal is output at a timing different from a timing at which the downlink signal is received, and includes a ping signal for synchronization of the downlink signal.

4. The touch display device of claim 1, further comprising:
   a touch power circuit configured to supply a first pulse modulated signal having the first amplitude or a second pulse modulation signal having the second amplitude to the touch driving circuit,
   wherein the touch driving circuit is configured to:
   output the uplink signal having the first amplitude based on the first pulse modulation signal before receiving the downlink signal; and
   output the uplink signal having the second amplitude based on the second pulse modulation signal after receiving the downlink signal.

5. The touch display device of claim 4, wherein the touch power circuit includes an adjusting unit configured to generate the first pulse modulation signal or the second pulse modulation signal based on control information and a reference pulse modulation signal.

6. The touch display device of claim 4, wherein the touch power circuit includes:
   a first adjusting unit configured to generate and output the first pulse modulation signal based on control information and a reference pulse modulation signal;
   a second adjusting unit configured to generate and output the second pulse modulation signal based on the control information and the reference pulse modulation signal; and
   a selecting unit configured to select one of the first adjusting unit and the second adjusting unit.

7. The touch display device of claim 6, wherein the first adjusting unit includes a first digital-to-analog converter, and the second adjusting unit includes a second digital-to-analog converter.

8. The touch display device of claim 1, wherein the touch driving circuit is configured to output a touch driving signal to at least one of the plurality of touch electrodes at a timing different from a timing at which the uplink signal is output, and
   wherein the first amplitude of the uplink signal corresponds to an amplitude of the touch driving signal, and the second amplitude of the uplink signal is larger than the amplitude of the touch driving signal.

9. The touch display device of claim 1, wherein the touch driving circuit is configured to:
   output the uplink signal having a first frequency or a first bitrate before receiving the downlink signal; and
   output the uplink signal having a second frequency or a second bitrate after receiving the downlink signal, and
   wherein the first frequency is lower than the second frequency, and the first bitrate is lower than the second bitrate.

10. The touch display device of claim 1, further comprising:
    a display panel including a plurality of subpixels and embedding the touch sensor,
    wherein a common voltage is applied to the plurality of touch electrodes during a display driving period for displaying an image.

11. The touch display device of claim 1, further comprising:
    a display panel including a plurality of subpixels and embedding the touch sensor,
    wherein the display panel includes a first electrode, a light emitting layer on the first electrode, a second electrode on the light emitting layer, and an encapsulation layer on the second electrode, and
    wherein the plurality of touch electrodes are disposed on the encapsulation layer, or the plurality of touch electrodes are disposed between electrodes where the second electrode is divided, or the plurality of touch electrodes are disposed under the second electrode.

12. The touch display device of claim 1, wherein a display frame period includes a vertical active period and a vertical blank period,
    wherein the vertical active period alternately includes a plurality of horizontal active periods and a plurality of horizontal blank periods, wherein the plurality of horizontal active periods are display driving periods, wherein the plurality of horizontal blank periods are touch drive periods, and wherein the plurality of horizontal blank periods include at least one touch driving period for transmitting the uplink signal to the pen and two or more touch driving periods for receiving the downlink signal from the pen.

13. The touch display device of claim 1, wherein a vertical synchronization signal sequentially includes a first vertical blank signal section having a first signal level, a first vertical active signal section having a second signal level different from the first signal level, and a second vertical blank signal section having the first signal level, and wherein the touch driving circuit is configured to:

receive the downlink signal during a first vertical active period corresponding to the first vertical active signal section;

output the uplink signal having the first amplitude during a first vertical blank period corresponding to the first vertical blank signal section; and output the uplink signal having the second amplitude larger than the first amplitude during a second vertical blank period corresponding to the second vertical blank signal section.

14. The touch display device of claim 13, further comprising:

a display panel embedding the touch sensor and including a plurality of subpixels; and a display sensing circuit configured to sense a characteristic value of a light emitting element or a transistor included in at least one of the plurality of subpixels during the first vertical blank period.

15. A driving circuit, comprising:

an interface configured to receive control information; and an adjusting unit configured to:

based on the control information, output a first pulse modulation signal having a first signal characteristic when a driving mode is a first mode when no pen touch has occurred; and output a second pulse modulation signal having a second signal characteristic different from the first signal characteristic when the driving mode is a second mode when a pen touch has occurred, wherein the control information is information that instructs the driving mode to be changed from the second mode to the first mode when no pen touch occurs for a predetermined period of time after the pen touch occurs.

16. The driving circuit of claim 15, wherein each of the first signal characteristic and the second signal characteristic includes an amplitude.

17. The driving circuit of claim 15, wherein each of the first signal characteristic and the second signal characteristic includes at least one of a frequency and a bitrate.

18. A method for driving a touch display device including a touch sensor, the method comprising:

determining whether a touch has occurred;

determining a type of the touch when the determining step has determined that the touch has occurred;

supplying a signal corresponding to a first mode to the touch sensor when the touch has not occurred or when the touch being a finger touch has occurred; and supplying a signal corresponding to a second mode to the touch sensor when the touch being a pen touch has occurred, wherein the signal corresponding to the second mode has a signal characteristic different from a signal characteristic of the signal corresponding to the first mode, wherein an amplitude of the signal corresponding to the first mode is smaller than an amplitude of the signal corresponding to the second mode, and wherein a frequency or a bitrate of the signal corresponding to the first mode is lower than a frequency or a bitrate of the signal corresponding to the second mode.

* * * * *